United States Patent
Sakai et al.

(10) Patent No.: US 9,542,270 B2
(45) Date of Patent: Jan. 10, 2017

(54) STORAGE CONTROL DEVICE, STORAGE DEVICE, INFORMATION PROCESSING SYSTEM AND STORAGE CONTROL METHOD

(71) Applicant: Sony Corporation, Tokyo (JP)

(72) Inventors: Lui Sakai, Kanagawa (JP); Keiichi Tsutsui, Kanagawa (JP); Yasushi Fujinami, Tokyo (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 14/318,927

(22) Filed: Jun. 30, 2014

(65) Prior Publication Data

US 2015/0026538 A1  Jan. 22, 2015

(30) Foreign Application Priority Data

Jul. 19, 2013 (JP) .................................. 2013-150003

(51) Int. Cl.
  *G11C 29/00* (2006.01)
  *G06F 11/10* (2006.01)
  *G11B 20/18* (2006.01)

(52) U.S. Cl.
  CPC ....... *G06F 11/1076* (2013.01); *G06F 11/1016* (2013.01); *G06F 11/1048* (2013.01); *G06F 11/1064* (2013.01); *G11B 20/1833* (2013.01)

(58) Field of Classification Search
  CPC ......................... G06F 11/1076; G06F 11/1048
  See application file for complete search history.

(56) References Cited

U.S. PATENT DOCUMENTS

| | | | | |
|---|---|---|---|---|
| 7,532,511 | B2* | 5/2009 | Conley | G06F 12/0246 365/185.09 |
| 7,594,157 | B2* | 9/2009 | Choi | G11C 11/5628 365/185.09 |
| 7,602,642 | B2* | 10/2009 | Choi | G06F 11/1072 365/185.09 |
| 7,646,666 | B2* | 1/2010 | Conley | G06F 12/0246 365/230.03 |
| 8,209,693 | B2* | 6/2012 | Matsuo | G06F 3/0613 718/100 |
| 8,533,564 | B2* | 9/2013 | Yurzola | G06F 11/1048 714/763 |
| 8,595,594 | B2* | 11/2013 | Liang | G06F 11/1012 714/766 |
| 8,788,894 | B2* | 7/2014 | Kang | G06F 11/1048 714/723 |
| 8,880,781 | B2* | 11/2014 | Hong | G06F 1/3275 365/185.33 |

(Continued)

FOREIGN PATENT DOCUMENTS

JP  2006-072989  3/2006

*Primary Examiner* — Esaw Abraham
(74) *Attorney, Agent, or Firm* — K&L Gates LLP

(57) ABSTRACT

An error detection-correction unit reads system information for operating a system from a first memory and performs error detection-correction processing. A control unit supplies the system information to a host computer in a case where the error detection-correction processing is successful. In addition, the control unit reads a backup of the system information from a second memory that is different from the first memory and supplies the backup of the system information to the host computer in a case where the detection-correction processing fails.

20 Claims, 23 Drawing Sheets

(56) References Cited

U.S. PATENT DOCUMENTS 8,929,146 B1* 1/2015 Asnaashari ............ G06F 3/0688
   365/158
9,176,808 B2* 11/2015 Shim ....................... G06F 11/10

* cited by examiner

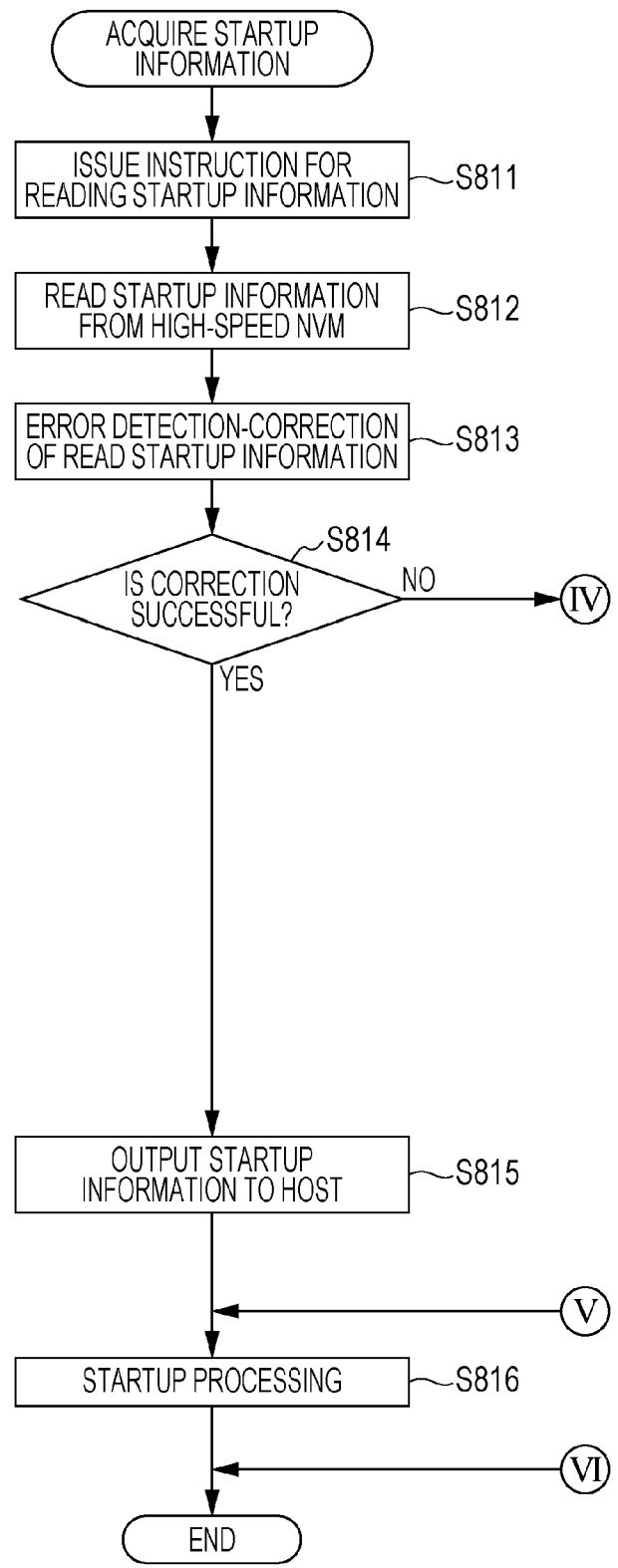

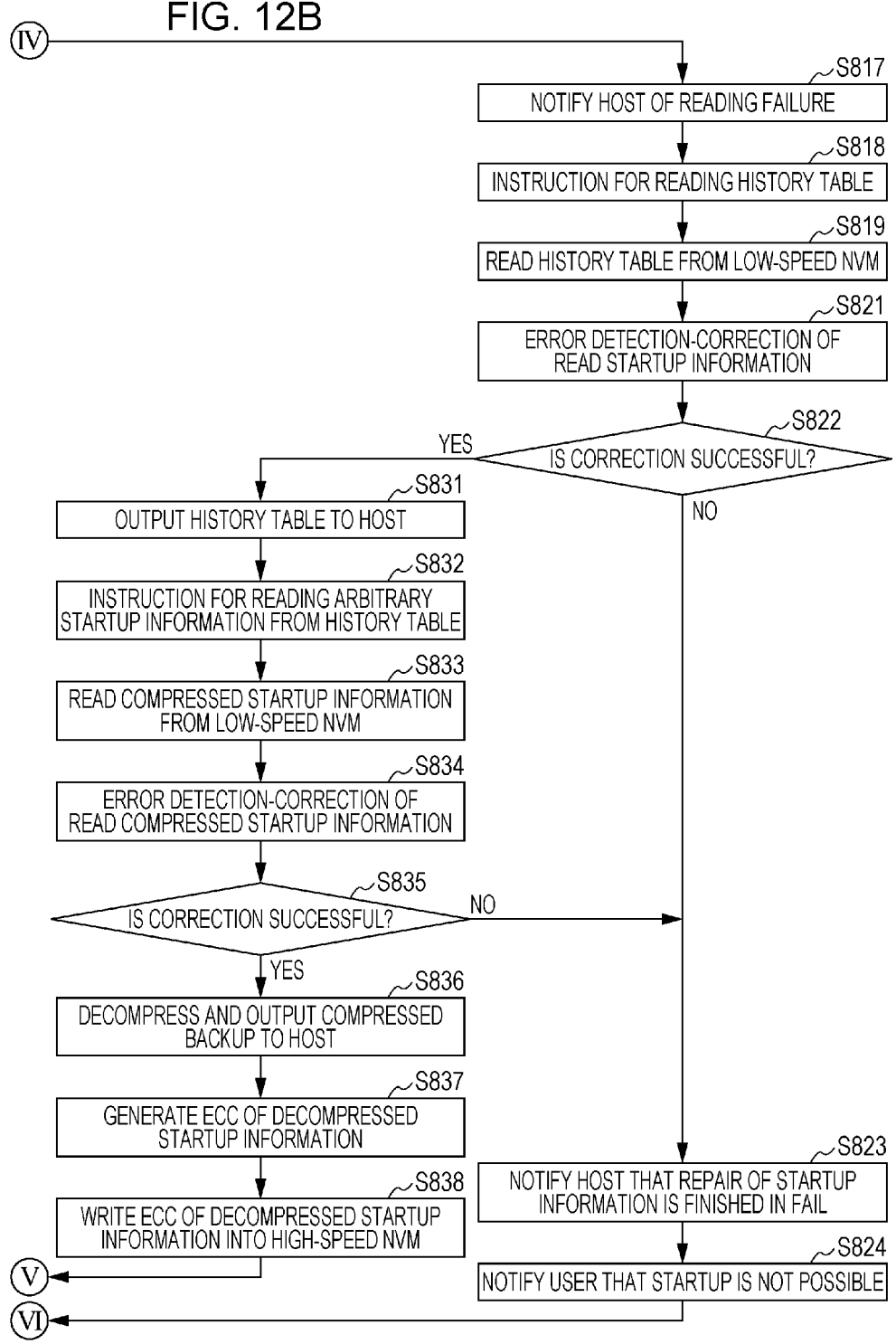

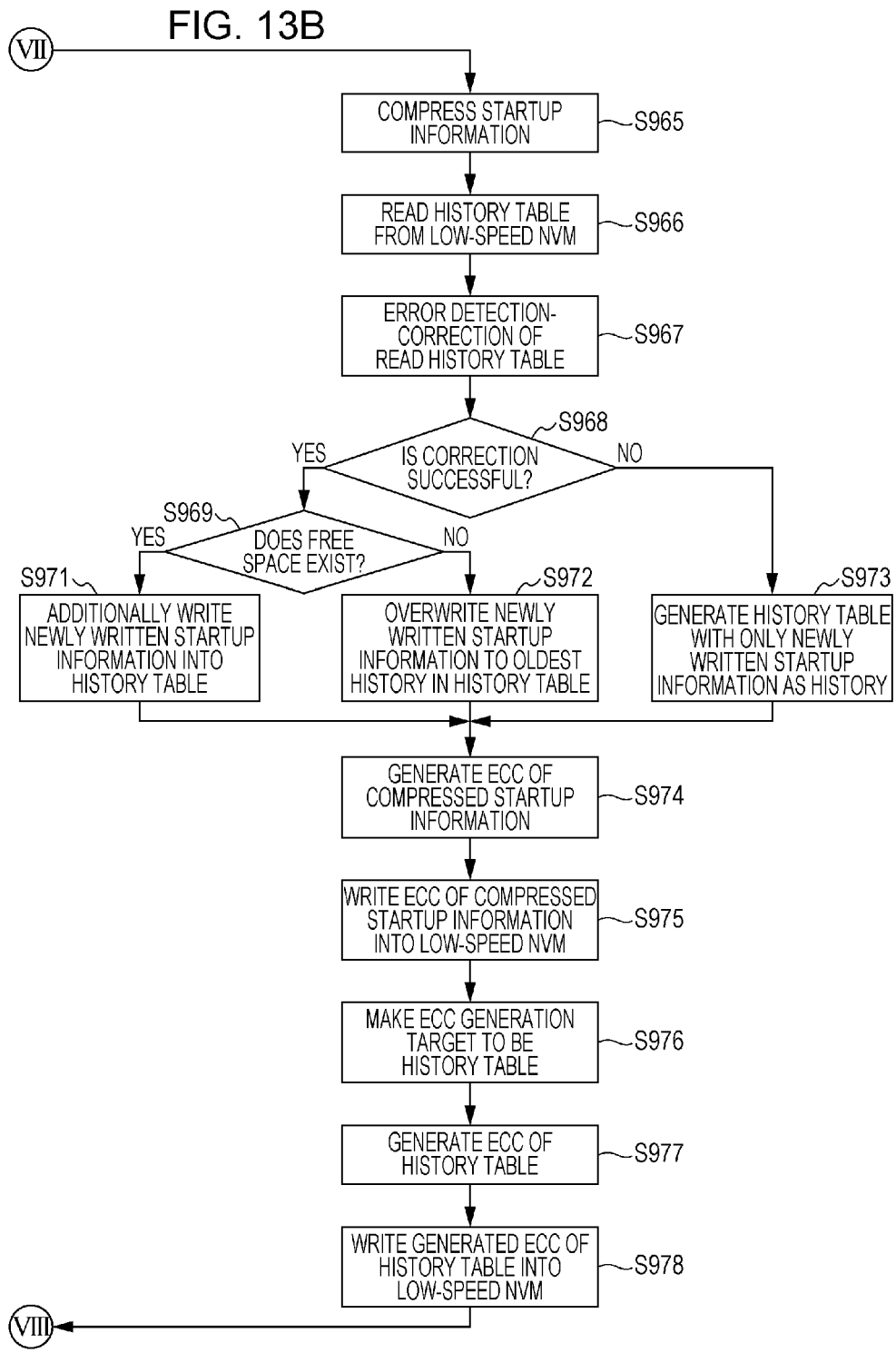

STORAGE CONTROL DEVICE, STORAGE DEVICE, INFORMATION PROCESSING SYSTEM AND STORAGE CONTROL METHOD

CROSS REFERENCES TO RELATED APPLICATIONS

The present application claims priority to Japanese Priority Patent Application JP 2013-150003 filed in the Japan Patent Office on Jul. 19, 2013, the entire content of which is hereby incorporated by reference.

BACKGROUND

The present application relates to a storage control device in which a plurality of types of memory is handled. Specifically, the present application relates to a storage control device, a storage device, and an information processing system, in which system information for operating a system is stored in a plurality of types of memory, and relates to a processing method therefor and a program for causing a computer to execute the method.

In an information processing system, startup information necessary for starting up a system is prepared in advance, and the information processing system is configured to read the startup information at the time of startup. Generally, the startup information is stored in a non-volatile recording medium such as a disk or a non-volatile memory and is deployed on a main memory at the time of startup. In addition, it is similar to system information for operating the system. For example, an electronic apparatus is disclosed, in which a boot program is compressed and stored in a non-volatile memory, and the boot program is decompressed and deployed on a RAM when the power is turned on (for example, refer to Japanese Unexamined Patent Application Publication No. 2006-072989).

SUMMARY

In the related art described above, startup information stored in a non-volatile memory is read and deployed on a main memory at the time of startup. The startup information is information which is read when the system starts up, and a read frequency is higher compared to that of ordinary data. There is a case in which the non-volatile memory easily deteriorates as the read frequency of a cell increases. In such a case, there is a problem in that it is difficult to normally read the startup information even though error correction is performed.

It is desirable to preserve the system information for operating the system and to normally perform the operation of the system.

According to an embodiment of the present application, there is provided a storage control device that includes: an error detection-correction unit that reads system information for operating a system from a first memory and performs error detection-correction processing; and a control unit that supplies the system information to a host computer in a case where the detection-correction processing is successful, and reads a backup of the system information from a second memory and supplies the backup of the system information to the host computer in a case where the detection-correction processing fails, and a storage control method thereof. In this way, in a case where the reading of the system information fails, there is an effect of utilizing the backup.

The storage control device according to the embodiment of the present application may further include a decompression unit that decompresses the backup of the system information compressed and stored in the second memory and supplies the decompressed backup of the system information to the control unit. In this way, there is an effect of improving the efficiency of a storage capacity of the second memory using the compressed backup.

The storage control device according to the embodiment of the present application may further include a second error detection-correction unit that performs detection-correction processing of the backup of the system information read from the second memory. In a case where the detection-correction processing of the backup of the system information is successful, the control unit may supply the backup to the host computer as the system information. In this way, there is an effect of improving integrity of the backup.

In the storage control device according to the embodiment of the present application, in a case where the detection-correction processing of the backup of the system information is successful, the control unit may cause the backup to be stored in the first memory as the system information. In this way, there is an effect of repairing the system information in which the error detection-correction processing has failed.

In the storage control device according to the embodiment of the present application, in a case where the detection-correction processing of the backup of the system information fails, the control unit may notify the host computer that the startup is not possible. In this way, there is an effect of prompting an exceptional measure.

In the storage control device according to the embodiment of the present application, it is desirable that the second error detection-correction unit have a higher error detection-correction capability than that of the error detection-correction unit. In this way, there is an effect of improving integrity of the backup.

In the storage control device according to the embodiment of the present application, in a case where an update of the system information is instructed, the control unit may cause the newly instructed system information to be stored in the first and second memories. In this way, there is an effect of updating the system information.

In the storage control device according to the embodiment of the present application, in a case where the detection-correction processing fails, the control unit may read history information that is made of a plurality of backups of the system information, select any one of the backups included in the history information, and supply the selected backup to the host computer as the system information. In this way, there is an effect of designating an arbitrary backup from a plurality of backups and using as the system information.

In the storage control device according to the embodiment of the present application, the control unit may cause the selected backup to be stored in the first memory as the system information. In this way, there is an effect of designating an arbitrary backup from a plurality of backups and repairing as the system information.

The storage control device according to the embodiment of the present application may further include a correspondence table that holds a correspondence relationship between the system information stored in the first memory and the backup of the system information stored in the second memory. The control unit may read the backup of the system information which corresponds to the system information, from the second memory based on the correspondence table. In this way, there is an effect of recognizing the corresponding address in the other memory.

The storage control device according to the embodiment of the present application may further include an access information management unit that manages an access history of the backup of the system information stored in the second memory. The control unit may instruct the second memory to rewrite the backup of the system information based on the access history. In this way, there is an effect of performing the refreshing of the backup based on the access history.

In the storage control device according to the embodiment of the present application, in a case where the detection-correction processing fails, the control unit may notify that it takes some time to supply the system information. In this way, there is an effect of preventing the host computer from timing-out from the startup information waiting state.

In the storage control device according to the embodiment of the present application, the control unit may compare the system information stored in the first memory and the backup of the system information stored in the second memory, and check whether both are coincident with each other or not. In this way, there is an effect of improving integrity of the backup.

According to another embodiment of the present application, there is provided a storage device that includes: a first memory that stores system information for operating the system; a second memory that stores a backup of the system information; an error detection-correction unit that reads the system information from the first memory and performs error detection-correction processing; and a control unit that supplies the system information to a host computer in a case where the detection-correction processing is successful, and reads a backup of the system information from a second memory and supplies the backup of the system information to the host computer in a case where the detection-correction processing fails. In this way, in a case where the reading of the system information fails, there is an effect of supplying the backup of the system information.

In the storage device according to the embodiment of the present application, the first and second memories may be non-volatile memories, and it is desirable that a processing time of the first memory be shorter than that of the second memory. In this way, there is an effect of performing the reading of the system information during the normal operation at a high speed.

According to still another embodiment of the present application, there is provided an information processing system that includes: a host computer; a first memory that stores system information for operating the information processing system; a second memory that stores a backup of the system information; an error detection-correction unit that reads the system information from the first memory and performs error detection-correction processing; and a control unit that supplies the system information to the host computer in a case where the detection-correction processing is successful, and reads the backup of the system information from the second memory and supplies the backup of the system information to the host computer in a case where the detection-correction processing fails. In this way, in a case where the reading of the system information fails, there is an effect of performing the operation using the backup of the system information.

According to the present application, an excellent effect in which the system information for operating the system can be preserved and the operation of the system can be performed normally, can be achieved.

Additional features and advantages are described herein, and will be apparent from the following Detailed Description and the figures.

BRIEF DESCRIPTION OF THE FIGURES

FIG. 12A and FIG. 12B are flow charts illustrating an example of a procedure of a startup information acquisition processing of the memory system module in the fifth embodiment of the present application;

FIG. 13A and FIG. 13B are flow charts illustrating an example of a procedure of a startup information update processing of the memory system module in the fifth embodiment of the present application;

DETAILED DESCRIPTION

Hereinafter, embodiments of the present application will be described. The description will be made in a following order.
1. First embodiment (no update of startup information, led by a memory controller)
2. Second embodiment (no update of startup information, led by a host computer)
3. Third embodiment (startup information update, led by a memory controller)
4. Fourth embodiment (startup information update, led by a host computer)
5. Fifth embodiment (a plurality of back-ups of startup information, led by a memory controller)
6. Sixth embodiment (a plurality of back-ups of startup information, led by a host computer)
7. Modification examples

1. FIRST EMBODIMENT

Outline of an Information Processing System

Figure 1:
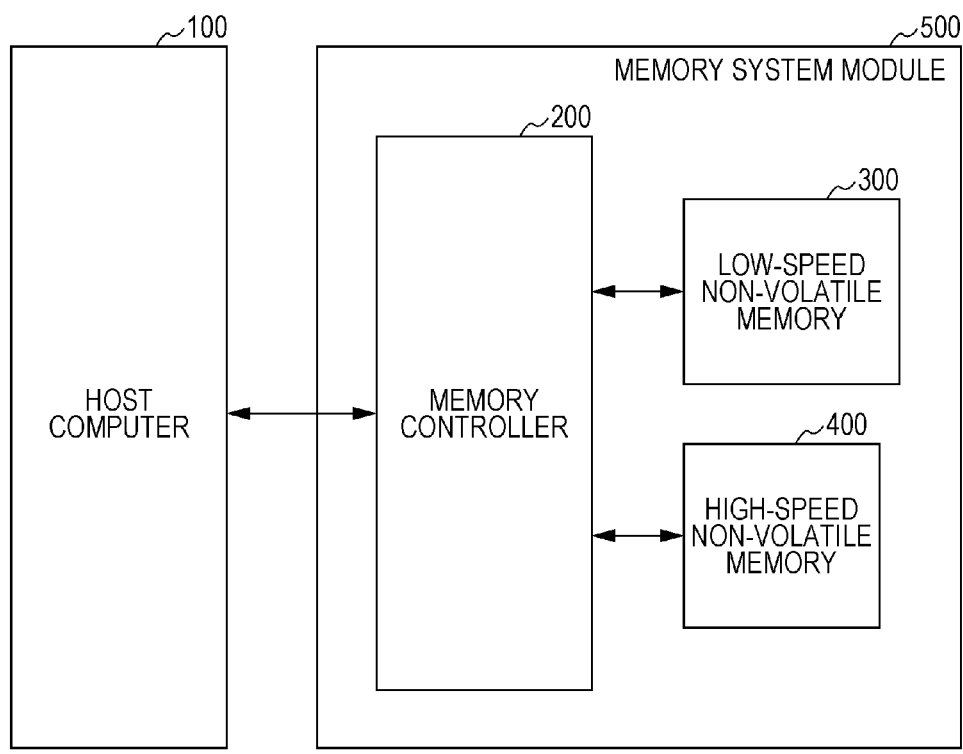
FIG. 1 is a diagram illustrating a configuration overview of an information processing system in the embodiments of the present application.

FIG. 1 is a diagram illustrating a configuration overview of an information processing system in the embodiments of the present application. The information processing system is configured to include a host computer 100, a memory controller 200, low-speed non-volatile memory 300, and a high-speed non-volatile memory 400. The memory controller 200, the low-speed non-volatile memory 300, and the high-speed non-volatile memory 400 configure a memory system module 500.

The host computer 100 issues a command requesting the memory system module 500 perform data read processing and data write processing.

The memory controller 200 communicates with the host computer 100 to receive the command, and performs an access with respect to the low-speed non-volatile memory 300 or the high-speed non-volatile memory 400. The memory controller 200, in a case where the write command is received, instructs the low-speed non-volatile memory 300 or the high-speed non-volatile memory 400 to write the data received from the host computer 100. In addition, the memory controller 200, in a case where the read command is received, reads the data from the low-speed non-volatile memory 300 or the high-speed non-volatile memory 400 and transfers the data to the host computer 100.

The memory controller 200 performs processing of generating an error correction code (ECC) of the high-speed non-volatile memory 400 and the low-speed non-volatile memory 300, and performs error detection-correction processing using the ECC. That is, when writing the data, a parity corresponding to each data item is added to be written (in some cases, referred to as encoding). In addition, when reading the data, an error detection-correction is performed based on the data and the parity (in some cases, referred to as decoding). The error correction code (ECC) is configured to have the information and the parity.

Both of the low-speed non-volatile memory 300 and the high-speed non-volatile memory 400 are non-volatile memories (NVM). The high-speed non-volatile memory 400 has a property of having a shorter read processing time than the low-speed non-volatile memory 300 has. A NAND flash memory, for example, is assumed as the low-speed non-volatile memory 300 (hereinafter, in some cases, referred to as low-speed NVM). In addition, a resistance change type non-volatile memory, for example, is assumed as the high-speed non-volatile memory 400 (hereinafter, in some case, referred to as high-speed NVM). The high-speed non-volatile memory 400 is an example of a first memory according to claims of the present application. In addition, the low-speed non-volatile memory 300 is an example of a second memory according to claims of the present application. Hereinafter, the description is made under the assumption that the low-speed non-volatile memory 300 and the high-speed non-volatile memory 400 are different memories. However, by physically dividing a memory into two areas, it is possible to cause the memory to function as the low-speed non-volatile memory 300 and the high-speed non-volatile memory 400. For example, in one high-speed non-volatile memory, in a case where a compression, a highly correctable error correction, and an encoding are performed on a backup, it is seen from the host computer 100 that the backup has a longer read processing time. Therefore, the backup area can be handled as the low-speed non-volatile memory.

In the embodiments of the present application, it is assumed that startup information is stored in the high-speed non-volatile memory 400 and is read and supplied to the host computer 100 when the system is started up. The startup information is information for starting up the system, and includes, for example, a startup program, an operating system, and a main application program. By storing the startup information in the high-speed non-volatile memory 400, it is possible to quicken the reading, and to speed up the system startup. Hereinafter, an example of reading the startup information when the system is started up will be described. However, the present application can widely be applied not only to the information that is read at the time of startup but also to system information for operating the system. For example, other application programs used with a high frequency after the startup are also examples of the system information. That is, there is a broad concept that the system information described according to claims of the present application is included in the startup information.

On the other hand, by storing data in which a high-speed access is not necessary in the low-speed non-volatile memory 300, the expensive high-speed non-volatile memory 400 and the comparatively low-speed non-volatile memory 300 are selectively used, and thus, it is possible to achieve optimization of cost and performance in system configuration.

In addition, in the embodiments of the present application, the backup of the startup information is stored in the low-speed non-volatile memory 300. In this way, when the reading of the startup information from the high-speed non-volatile memory 400 fails, the necessary startup information can be supplied to the host computer 100, and thus, it is possible to start up the system normally.

In order to speed up the access to the low-speed non-volatile memory 300, the data stored in the low-speed non-volatile memory 300 may be compressed to reduce a size of the data. In this way, the access area can be reduced, and the processing can be speeded up. Since it takes long time for writing or reading to and from the low-speed non-volatile memory 300, even considering the increased processing time for compression and decompression processing, it is possible to reduce the time for writing and reading to and from the low-speed non-volatile memory 300.

In the embodiments of the present application, the compression means a reversible compression. A unit on which the reversible compression is performed is selectable. That is, the reversible compression may be collectively performed with the entire startup information as the unit. In addition, the compression may be performed in the unit of the startup program, the operating system, and the main application program. In addition, the compression may be performed in further subdivided units according to each of the properties. In addition, the compression may be performed in the unit of an access category such as a page size of the non-volatile memory 400.

Resistance State of the High-Speed Non-Volatile Memory

Figure 2:
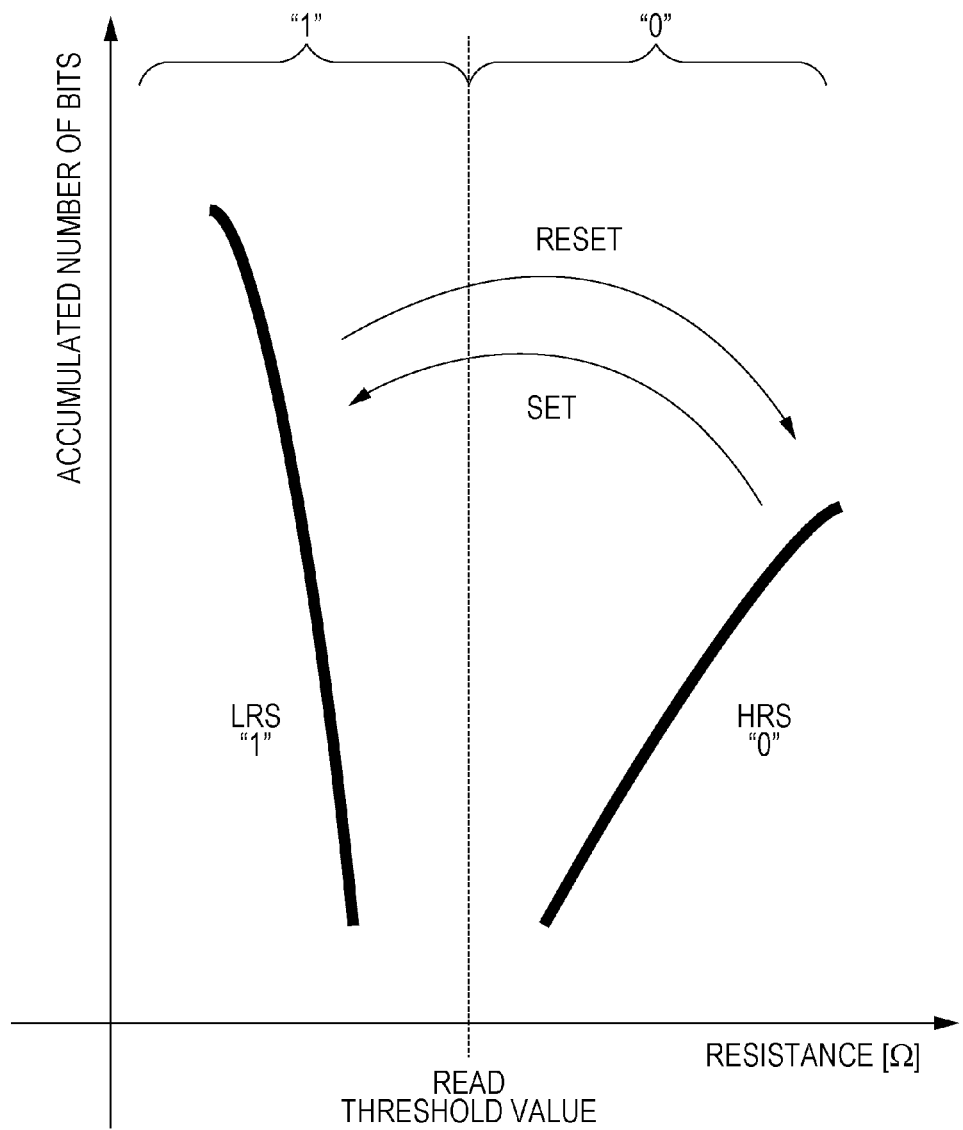
FIG. 2 is a diagram illustrating a resistance distribution of a resistance change type non-volatile memory which is assumed as a high-speed non-volatile memory in the embodiments of the present application.

FIG. 2 is a diagram illustrating a resistance distribution of a resistance change type non-volatile memory which is assumed as a high-speed non-volatile memory 400 in the embodiments of the present application. The resistance change type non-volatile memory transits to a low resistance state (LRS) by a setting operation and transits to a high resistance state (HRS) by a resetting operation. In a case where the data is read from the resistance change type non-volatile memory, the resistance state is determined based on a reference resistance value indicated by a read threshold value.

In the setting operation and the resetting operation, a direction of the voltage applied to the cell is mutually reverse direction. At the time of reading, a low voltage is applied to a cell subject to be read in the same direction as that of a resetting operation. The read processing can be considered to be a weak write processing, with the cell deteriorating by the reading. Therefore, there is a tendency for the cell having a high number of reads to have poor storage characteristics.

By reversely changing the resistance state between the low resistance state and the high resistance state, a memory capable of storing one bit in one memory cell can be realized. Even after stopping the application of voltage, since the data is held, the memory functions as a non-volatile memory. Hereinafter, an example in which the data read from the cell of a low resistance state is "1" and the data read from the high resistance state is "0" will be described. However, the digits "1" and "0" may be associated with any data.

Configuration of the Memory System Module

Figure 3:
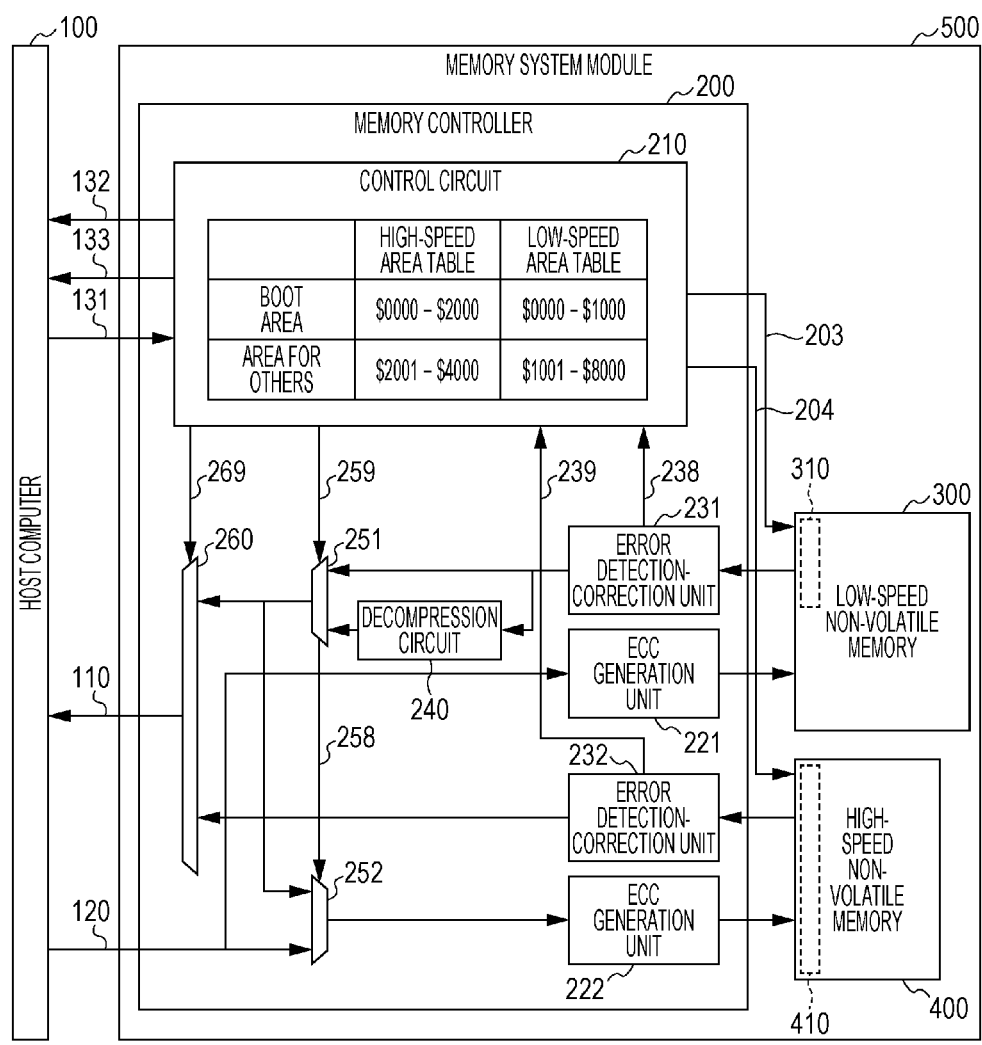
FIG. 3 is a diagram illustrating a configuration example of a memory system module in a first embodiment of the present application.

FIG. 3 is a diagram illustrating a configuration example of a memory system module 500 in a first embodiment of the present application. In the drawing, in order to avoid complexity, only a circuit configuration and signal lines that are necessary for describing the embodiment are indicated, but other circuits and signal lines for configuring the system may be included.

The high-speed non-volatile memory 400 has two areas, a first area is a boot area for startup and a second area is an area for others. In the boot area, startup information 410 is stored when the system product is shipped. When the host computer 100 issues an instruction for reading the startup information to the memory system module 500, a control circuit 210 of the memory controller 200 reads the startup information 410 stored in the boot area with reference to a correspondence table. In the second area, any data other than the startup information can be stored. For example, data which is to be accessed at high speed may be stored in the high-speed non-volatile memory 400. In addition, a copy of the data stored in the low-speed non-volatile memory 300 may be stored as a cache. Since it takes a comparatively long time for the low-speed non-volatile memory 300 to write, a power off during the writing may result in a data loss. For this reason, before writing the data to the low-speed non-volatile memory 300, by temporarily writing the data as a cache in the high-speed non-volatile memory 400, it is possible to prevent the data loss.

The low-speed non-volatile memory 300 has two areas, a first area is an area, as a boot area, for storing the startup information that is compressed and backed up, and a second area is a storage area for user data. In the boot area, a backup 310 is stored, in which the startup information stored in the high-speed non-volatile memory 400 when the product is shipped is compressed. When the startup information 410 is read from the high-speed non-volatile memory 400, in a case where the startup information 410 is damaged, the backup 310 stored in the low-speed non-volatile memory 300 is read. The user data is stored in the second area, but other data may be stored as necessary.

The data stored in the low-speed non-volatile memory 300 and the high-speed non-volatile memory 400 includes management information of the low-speed non-volatile memory 300 and the high-speed non-volatile memory 400 besides the user data transmitted from the host computer 100. Here, for convenience, a signal path of the management information is omitted.

In the first embodiment, the memory controller 200 includes a control circuit 210, ECC generation units 221 and 222, error detection-correction units 231 and 232, a decompression circuit 240, and selectors 251, 252, and 260.

The control circuit 210 is a circuit that controls various operations in the memory controller 200. The control circuit 210 has a function of interpreting an instruction from the host computer 100. In addition, the control circuit 210 performs an access control with respect to the low-speed non-volatile memory 300 and the high-speed non-volatile memory 400 based on the result of the detection-correction processing in the error detection-correction units 231 and 232. In addition, the control circuit 210 notifies the host computer 100 of the state of the memory system module 500 through a startup information repair flag or a startup information success flag described below. In addition, the control circuit 210 supplies a selection signal with respect to the selectors 251 and 260.

In addition, the control circuit 210 holds a correspondence table that indicates a corresponding relationship of the areas in the low-speed non-volatile memory 300 and the high-speed non-volatile memory 400, and has a function of recognizing the boot area of the low-speed non-volatile memory 300 corresponding to the boot area of the high-speed non-volatile memory 400. In the first embodiment, in a case where the reading of the startup information 410 from the high-speed non-volatile memory 400 fails, the control circuit 210 starts to read the backup 310 from the low-speed non-volatile memory 300. The backup 310 is stored in the boot area of the low-speed non-volatile memory 300, thus, the control circuit 210 starts the reading by automatically determining the boot area. The correspondence relationship of the boot area of the high-speed non-volatile memory 400 and the low-speed non-volatile memory 300 is not instructed from the host, but the correspondence relationship is automatically recognized using the correspondence table of the control circuit 210.

The correspondence table for recognizing the boot area of the low-speed non-volatile memory 300 corresponding to the boot area of the high-speed non-volatile memory 400 is assumed to be defined in the specification or to be included in the management information. In a case where the correspondence table is uniquely defined in the specification, the correspondence table may exist as hardware or ROM data. In a case where the correspondence table is not defined in advance, the correspondence table may be automatically read after the power is turned ON in the memory system module 500 as information stored in the high-speed non-volatile memory 400 or as the management information stored in the low-speed non-volatile memory 300.

The corresponding relationship between the access of the startup information 410 in the high-speed non-volatile memory 400 and the access of the backup 310 in the low-speed non-volatile memory 300 depends on the unit of compression. For example, in a case where the compression is performed in three units of the startup program, an OS, and a main application program, in order to read the corresponding backup 310 from the low-speed non-volatile memory 300, a corresponding relationship of address is necessary.

The ECC generation unit 221 generates an ECC of the data written in the low-speed non-volatile memory 300. A parity of the ECC generated by the ECC generation unit 221 is written in the low-speed non-volatile memory 300 as the ECC in associated with the data.

The ECC generation unit 222 generates an ECC of the data written in the high-speed non-volatile memory 400. A parity of the ECC generated by the ECC generation unit 222 is written in the high-speed non-volatile memory 400 as the ECC in associated with the data.

The error detection-correction unit 231 performs error detection and correction processing based on the ECC read from the low-speed non-volatile memory 300. The success or failure of the error detection and correction processing is notified to the control circuit 210 via a signal line 238. If errors are not detected, the error detection and correction processing is regarded as successful. Even if errors are detected and the errors can be corrected, the error detection and correction processing is regarded as successful. On the other hand, in a case where the detected errors are hard to be corrected, the error detection and correction processing is regarded as having failed. The error detection-correction unit 231 is an example of a second error detection-correction unit in the claims of the present application.

The error detection-correction unit 232 performs an error detection and correction processing based on the ECC read from the high-speed non-volatile memory 400. The success or failure of the error detection and correction is notified to the control circuit 210 via a signal line 239. The error detection-correction unit 232 is an example of an error detection-correction unit in the embodiment of the present application.

The decompression circuit 240 decompresses the data on which the error detection and correction processing is performed by the error detection-correction unit 231. The decompression circuit 240 performs a decompression processing for returning the compressed data to the original state, under the assumption that the input data is compressed.

The selector 251 selects any one of the data on which the detection-correction processing is performed by the error detection-correction unit 231 or the data which is decompressed by the decompression circuit 240. The selector 251 performs the selection based on the selection signal given as an instruction from the control circuit 210 via a signal line 259.

The selector 252 selects any one of the write data given as an instruction from the host computer 100 or the output of the selector 251. The selector 252 performs the selection based on the selection signal instructed from the selector 251.

The selector 260 selects any one of the data on which the detection and correction processing is performed by the error detection-correction unit 232 or the output of the selector 251. The selector 260 performs the selection based on the selection signal instructed from the control circuit 210 via a signal line 269.

The memory system module 500 in the first embodiment includes signal lines 110, 120, 131 to 133 as interfaces between the host computer 100 and the memory system module 500. The signal line 110 supplies the read data from the low-speed non-volatile memory 300 or the high-speed non-volatile memory 400 to the host computer 100. The read data includes the startup information. The signal line 120 supplies the write data to the low-speed non-volatile memory 300 or the high-speed non-volatile memory 400 from the host computer 100.

The signal line 131 is used for the instruction for reading the startup information from the host computer 100. The signal line 132 is used for the notification to the host computer 100 of the startup information repair flag which indicates that the startup information is under repair. The signal line 133 is used for the notification to the host computer 100 of the startup information repair success flag which indicates that the repair of the startup information is successful.

Here, examples of using dedicated signal lines as interfaces are described. However, if the same information can be transmitted by an instruction by a command, the processing state confirmation by a register polling, or sharing of a separate port, other means may be used to realize the interface. In addition, a function such as transmission of command address included in the memory system module 500 is assumed to be similarly included as the information processing system even though the functions are not illustrated in FIG. 3 in order to avoid complexity of the drawing. In FIG. 3, an example of a one-way communication interface is illustrated in order to clearly illustrate the selector. However, a bi-directional communication interface may be used.

Operation of the Memory System Module

Figure 4:
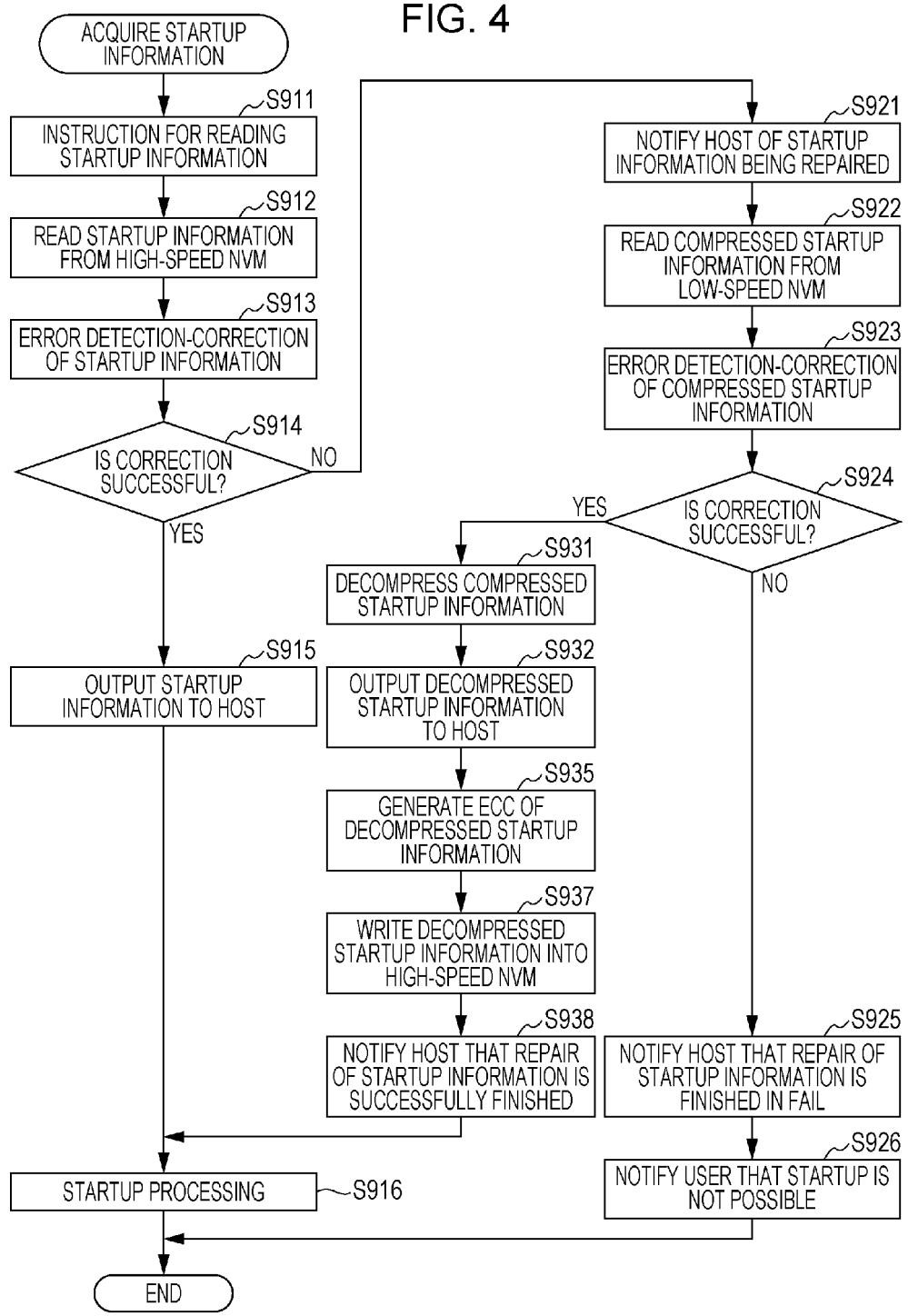
FIG. 4 is a flow chart illustrating an example of a procedure of a startup information acquisition processing of the memory system module in the first embodiment of the present application.

FIG. 4 is a flow chart illustrating an example of a procedure of a startup information acquisition processing of the memory system module 500 in the first embodiment of the present application.

First, the host computer 100 issues an instruction for reading the startup information to the memory system module 500 (STEP S911). The control circuit 210 analyzes the instruction for reading the startup information issued by the host computer 100 and performs a control of reading the startup information 410 from the high-speed non-volatile memory 400 (STEP S912). The error detection-correction unit 232 performs error detection-correction processing for the startup information 410 read from the high-speed non-volatile memory 400, and notifies the control circuit 210 of the success or failure of the detection-correction processing via the signal line 239 (STEP S913).

In a case where the detection-correction processing is successful (Yes in STEP S914), the control circuit 210 controls the selector 260 via the signal line 269 and outputs the startup information output from the error detection-correction unit 232 to the host computer 100 (STEP S915). The host computer 100 performs the startup processing using the startup information (STEP S916).

In a case where the detection-correction processing fails (No in STEP S914), the control circuit 210 notifies the host computer 100 via the signal line 132 that the startup information is being repaired and it will take time to supply the startup information (STEP S921). The notification is to prevent the host computer 100 timing-out from the startup information waiting state. Then, the control circuit 210 performs a control of reading the compressed backup 310 of the startup information from the low-speed non-volatile memory 300 (STEP S922). The error detection-correction unit 231 performs error detection-correction processing for the backup 310 read from the low-speed non-volatile memory 300 and notifies the control circuit 210 of the success or failure of the detection-correction processing via the signal line 238 (STEP S923).

In a case where the detection-correction processing is successful (Yes in STEP S924), the decompression circuit 240 decompresses the backup output from the error detection-correction unit 231 (STEP S931). The control circuit 210 controls the selectors 251 and 260 via the signal lines 259 and 269, and outputs the output of the decompression circuit 240 to the host computer 100 as the startup information (STEP S932). In addition, the selector 252 is controlled by the signal line 258 from the selector 251, and the output of the selector 251 is supplied to the ECC generation unit 222. In this way, the ECC generation unit 222 generates the ECC with regard to the output of the selector 252 (STEP S935). The control circuit 210 writes the ECC generated by the ECC generation unit 222 to the high-speed non-volatile memory 400 based on the output of the selector 252 in order to repair the startup information 410 of the high-speed non-volatile memory 400 (STEP S937). The control circuit 210 notifies the host computer 100 via the signal lines 132 and 133 that the repair of the startup information is successfully finished (STEP S938). In this way, the host computer 100 performs the startup processing using the startup information output in STEP S932 (STEP S916).

In a case where the detection-correction processing fails (No in STEP S924), the control circuit 210 notifies the host computer 100 via the signal lines 132 and 133 that the repair of the startup information has finished in failure (STEP S925). In this way, the host computer 100 notifies the user that the startup processing has failed and the startup is not possible (STEP S926).

In the example, the startup processing in the host computer 100 is performed after the finishing of the repair of the startup information 410 in the high-speed non-volatile memory 400 in STEP S935 and S936. However, the repair of the startup information 410 and the startup processing may be performed in parallel.

In addition, in the example, it is assumed that the entire startup information is compressed. However, in a case where a unit of compression is small, the startup information may be compressed sequentially and may be repaired referring to a correspondence table. For example, in a case where the compression is performed for each file type, it can be considered that the files are read one by one from the high-speed non-volatile memory 400, error detection-correction processing is performed, the startup information of one file is output to the host computer 100, and above processing is repeated. In addition, for example, in a case where the compression is performed for each page, it can be considered that the file is read for each page from the high-speed non-volatile memory 400, error detection-correction processing is performed, the startup information of one page is output to the host computer 100, and above processing is repeated.

In this way, according to the first embodiment of the present application, in a case where the reading of the startup information 410 from the high-speed non-volatile memory 400 fails, it is possible to start up the system by reading and decompressing the compressed backup 310 from the low-speed non-volatile memory 300. In addition, it is possible to repair the startup information 410 in the high-speed non-volatile memory 400 based on the compressed backup 310.

MODIFICATION EXAMPLE

In the example, the dedicated signal lines for the startup information repair flag or the startup information success flag are provided as the interface between the host computer 100 and the memory controller 200. However, any means that can notify may be used, such as the polling of the register value. In addition, in the example, the dedicated signal line for the instruction from the host computer 100 to read the startup information is provided. However, any means that can instruct to read may be used, such as a command.

In addition, the host computer 100 may have a function of instructing to compare the startup information 410 and the backup 310 to check coincidence. In this case, the memory system module 500 has a function of notifying the host computer 100 of a result of coincidence checking. For example, it is assumed that the instruction for checking the coincidence for each time the startup processing is performed for a predetermined number of times. In addition, the host computer 100 may have a function of instructing to check the coincidence and receiving the notification of the result of the coincidence checking as a means for checking the startup information even at the time other than the startup. For example, it may be assumed that the host computer 100 may instruct the coincidence checking when the error correction is detected.

In addition, regarding the correspondence table of the boot area of the high-speed non-volatile memory 400 and the boot area of the low-speed non-volatile memory 300, the host computer 100 may have a function of generating the ECC and performing the refreshment of the correspondence table based on the number of error bits.

In addition, in a case of dual boot system capable of starting up a plurality of systems, it can be considered that the respective area management tables of the system are divided and are selectively used.

In addition, here, the description is made under the assumption that the backup 310 is compressed. However, the backup 310 of a non-compressed state may be stored in the low-speed non-volatile memory 300. However, in this case, a storage capacity for storing the backup 310 becomes larger compared to the case of compression.

The modification examples described above can be applied to the other embodiments.

2. SECOND EMBODIMENT

In the first embodiment described above, the memory controller 200 leads the performing of the acquisition of the startup information. However, in the second embodiment, the startup information is acquired according to the instruction from the host computer 100.

Configuration of the Memory System Module

Figure 5:
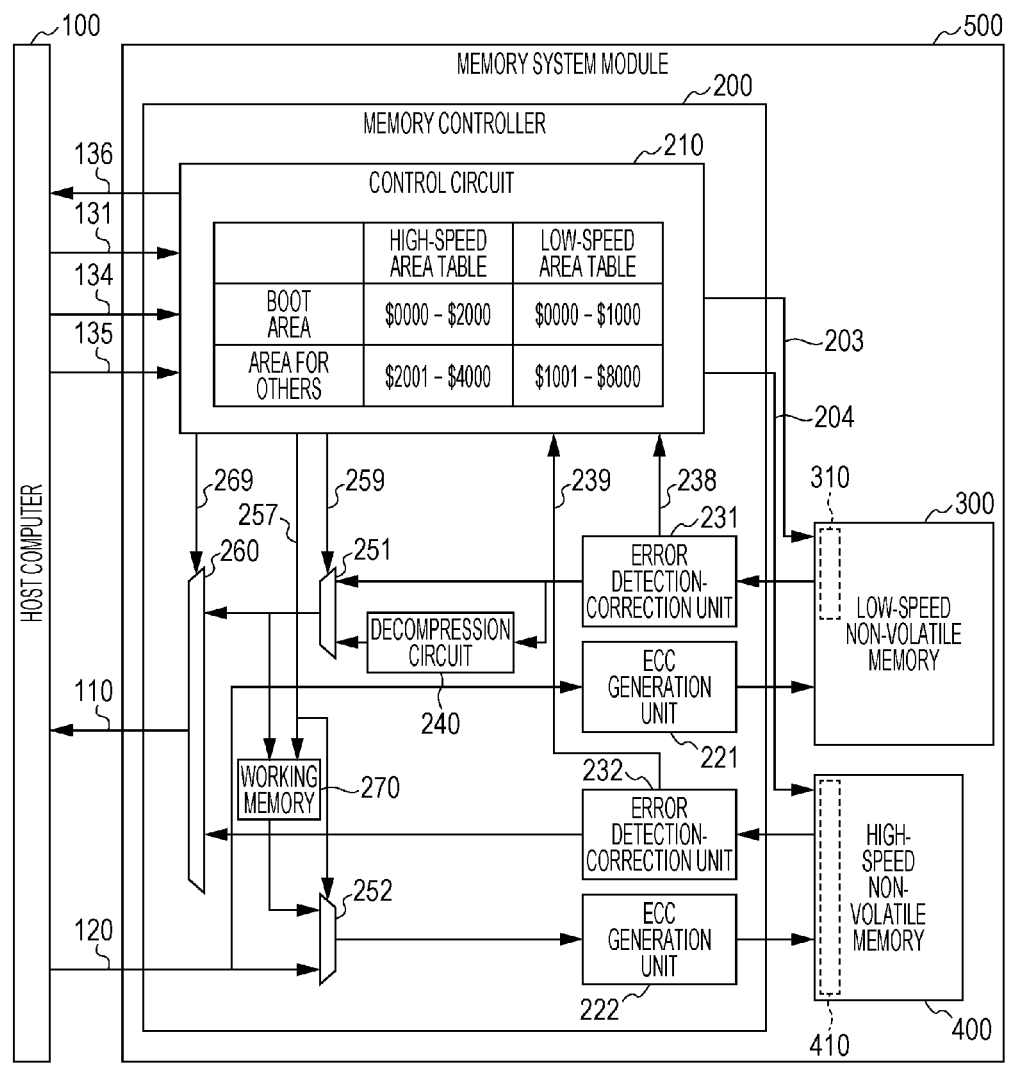
FIG. 5 is a diagram illustrating a configuration example of a memory system module in a second embodiment of the present application.

FIG. 5 is a diagram illustrating a configuration example of the memory system module 500 in the second embodiment of the present application.

The memory system module 500 in the second embodiment includes signal lines 110, 120, 131, and 134 to 136 as interfaces between the host computer 100 and the memory system module 500. The signal lines 110, 120, and 131 are similar to those in the first embodiment.

The signal line 134 is used for the instruction for reading the backup from the host computer 100. The signal line 135 is used for the instruction for repairing the startup information from the host computer 100. The signal line 136 is used for the notification to the host computer 100 of a startup information reading failure flag which indicates that the reading of the startup information has failed.

The memory system module 500 in the second embodiment includes a working memory 270, which is a point different from the first embodiment. However, in other points, the memory system module 500 in the second embodiment includes a configuration basically similar to that in the first embodiment.

The working memory 270 is a volatile memory for temporarily holding the data necessary for various processes performed in the memory controller 200. By providing the working memory 270, it is possible to temporarily hold the result of an instruction from the host computer 100. Therefore, it is possible to cause each processing to proceed according to the instruction from the host computer 100.

In the second embodiment, the control circuit 210 notifies the host computer 100 of the state of the memory system module 500 through the startup information reading failure flag. In addition, the control circuit 210 performs an access control of the working memory 270 via the signal line 257. The other points are similar to the case in the first embodiment.

Operation of the Memory System Module

Figure 6A:
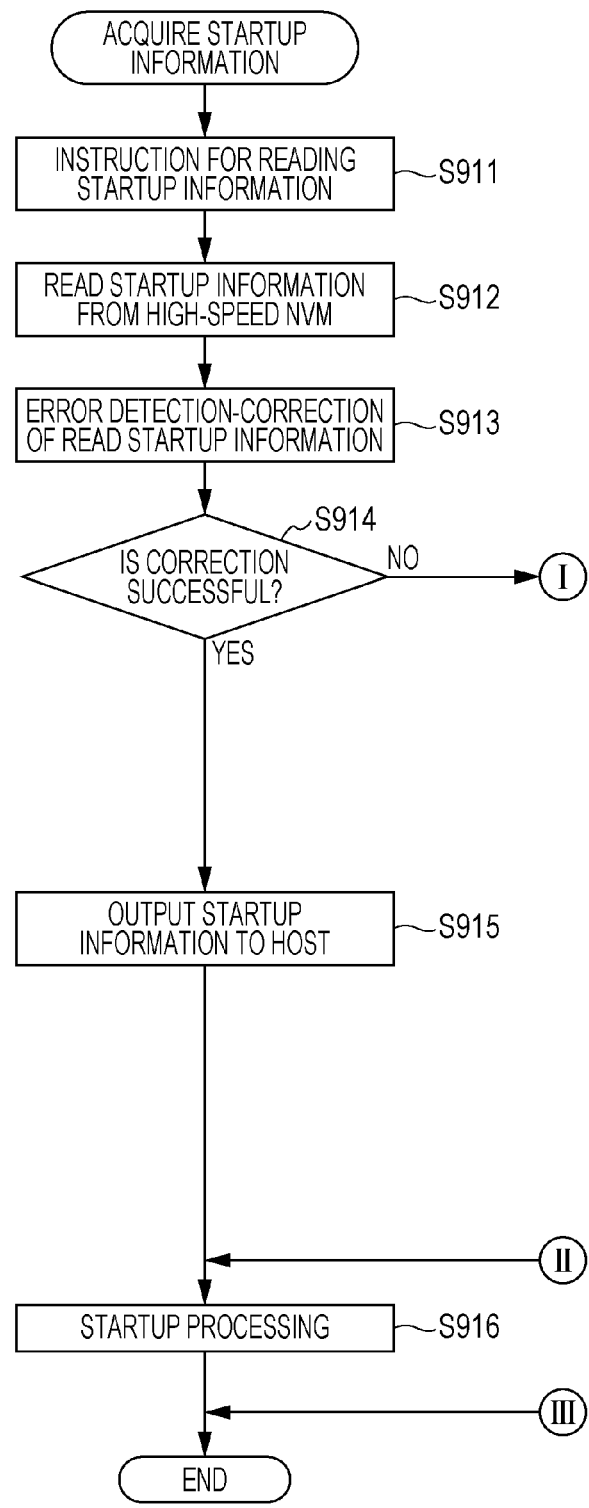
FIG. 6A and FIG. 6B are flow charts illustrating an example of a procedure of a startup information acquisition processing of the memory system module in the second embodiment of the present application.
Figure 6B:
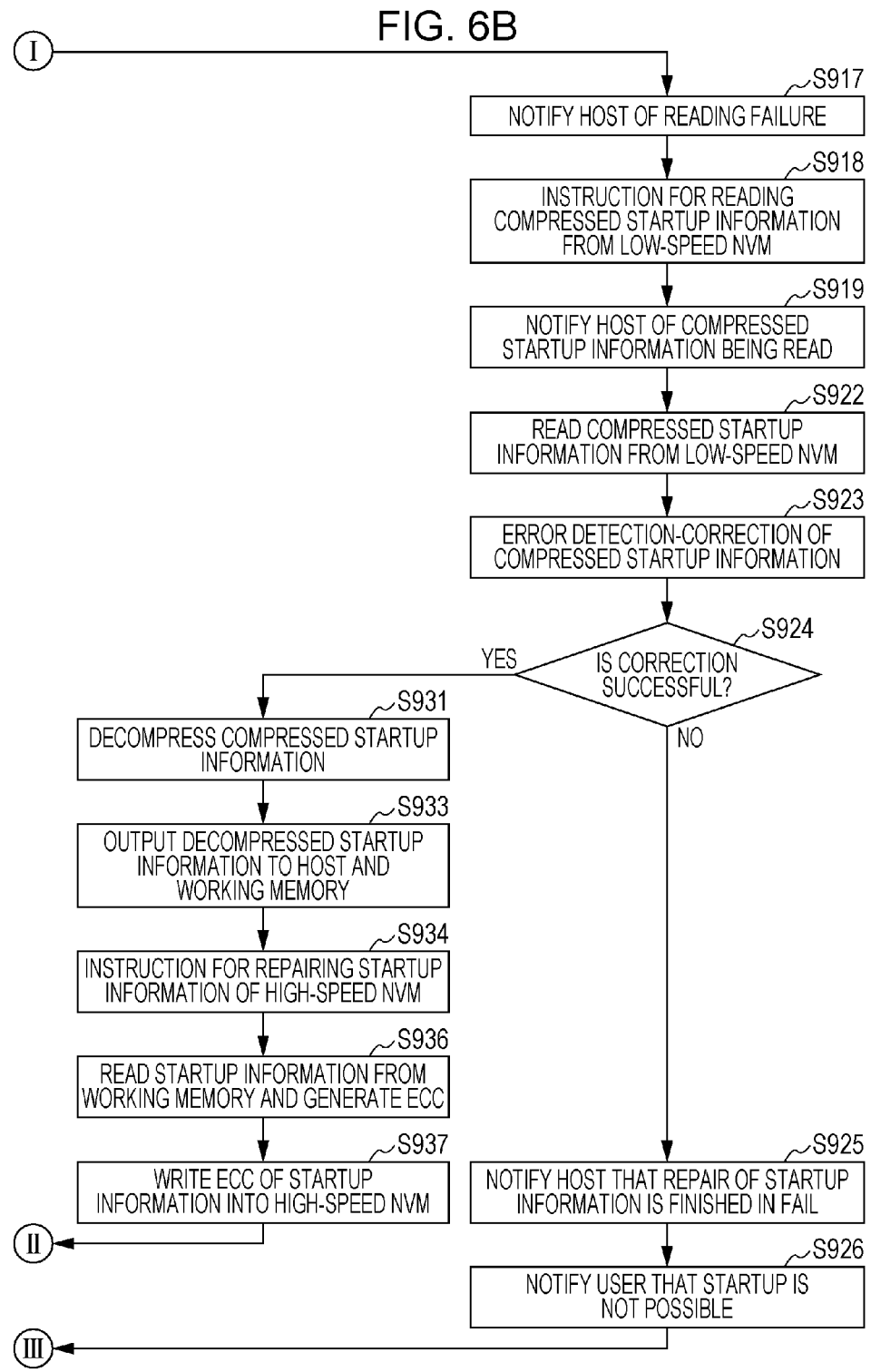

FIG. 6A and FIG. 6B are flow charts illustrating an example of a procedure of a startup information acquisition processing of the memory system module 500 in the second embodiment of the present application.

With regard to the instruction (STEP S911) to read the startup information from the host computer 100, the processing procedure until the startup processing (STEP S916) in a case where the startup information is normally acquired is performed, is similar to that in the first embodiment.

In a case where the detection-correction processing fails (No in STEP S914), the control circuit 210 notifies the host computer 100 via the signal line 136 of the startup information reading failure flag which indicates that the reading of the startup information has failed (STEP S917). In response to this, the host computer 100 issues an instruction for reading the backup 310 of the compressed startup information from the low-speed non-volatile memory 300 via the signal line 134 (STEP S918). The control circuit 210 which analyzes the instruction resets the startup information reading failure flag of the signal line 136 (STEP S919). In this way, the host computer 100 recognizes that the reading of the backup 310 is started. Then, the control circuit 210 performs a control of reading the compressed backup 310 of the startup information from the low-speed non-volatile memory 300 (STEP S922). The error detection-correction unit 231 performs error detection-correction processing for the backup 310 read from the low-speed non-volatile memory 300 and notifies the control circuit 210 of the success or failure of the detection-correction processing via the signal line 238 (STEP S923).

In a case where the detection-correction processing is successful (Yes in STEP S924), the decompression circuit 240 decompresses the backup output from the error detection-correction unit 231 (STEP S931). The control circuit 210 controls the selectors 251 and 269 via the signal lines 259 and 269, and outputs the output of the decompression circuit 240 to the host computer 100 as the startup information (STEP S933). Simultaneously, the control circuit 210 writes the output of the decompression circuit 240 (decompressed startup information) into the working memory 270 by performing a control of writing to the working memory 270 via the signal line 257 in addition to controlling of the selector 251 via the signal line 259 (STEP 933). Subsequently, the host computer 100 issues an instruction for repairing the startup information 410 in the high-speed non-volatile memory 400 via the signal line 135 (STEP S934). The control circuit 210 which analyzes the instruction reads the decompressed startup information from the working memory 270, and supplies the decompressed startup information to the ECC generation unit 222 from the selector 252. In this way, the ECC generation unit 222 generates the ECC with regard to the output of the selector 252 (STEP S936). The control circuit 210 writes the ECC generated by the ECC generation unit 222 to the high-speed non-volatile memory 400 based on the output of the selector 252 in order to repair the startup information 410 of the high-speed non-volatile memory 400 (STEP S937). The host computer 100 can recognize the success or failure of the writing by a success and failure confirmation means similar to the normal means such as reading of a status register. As a result, the host computer 100 performs the startup processing using the startup information output in STEP S933 (STEP S916).

In a case where the detection-correction processing fails (No in STEP S924), the control circuit 210 notifies the host computer 100 that the repair of the startup information has finished in failure by resetting the startup information reading failure flag of the signal line 136 (STEP S925). As a result, the host computer 100 notifies the user that the startup processing has failed and the startup is not possible (STEP S926).

In the example, the repair processing in STEP S936 and S937 is performed before the startup processing (STEP S916). However, since the startup information is held in the working memory 270, the host computer 100 may issue the repair instruction after the startup.

In this way, according to the second embodiment of the present application, in a case where the reading of the startup information 410 from the high-speed non-volatile memory 400 fails, the host computer 100 can lead the performing of the read processing of the backup 310.

MODIFICATION EXAMPLE

In the example, the failure of the error detection-correction processing in the memory controller 200 is treated as an abnormality. On the contrary, even in a case where the error detection-correction processing is successful, when the host computer 100 itself detects the abnormality of the startup information, the host computer 100 may be able to use the compressed backup 310. The abnormality can be detected not only by the ECC generated by the memory controller 200 at the time of writing into the high-speed non-volatile memory 400 but also by adding a CRC or a checksum to the startup information by the host computer 100.

In addition, in a case where the host computer 100 has any user interface, the user can also instruct to use and repair the backup. That is, in a case where the system is unable to automatically detect the error such as an erroneous determination of the ECC, the user can discover the defect of the startup operation, and can instruct the startup using the backup 310 and repair of the startup information 410 in the high-speed non-volatile memory 400.

The modification examples described here can be applied to the other embodiments.

3. THIRD EMBODIMENT

In the first and second embodiment described above, it is assumed that the startup information written in before the product shipment is continuously used without updating the content of the startup information. In contrast, in the third embodiment, the startup information is appropriately updated if necessary.

Configuration of a Memory System Module

Figure 7:
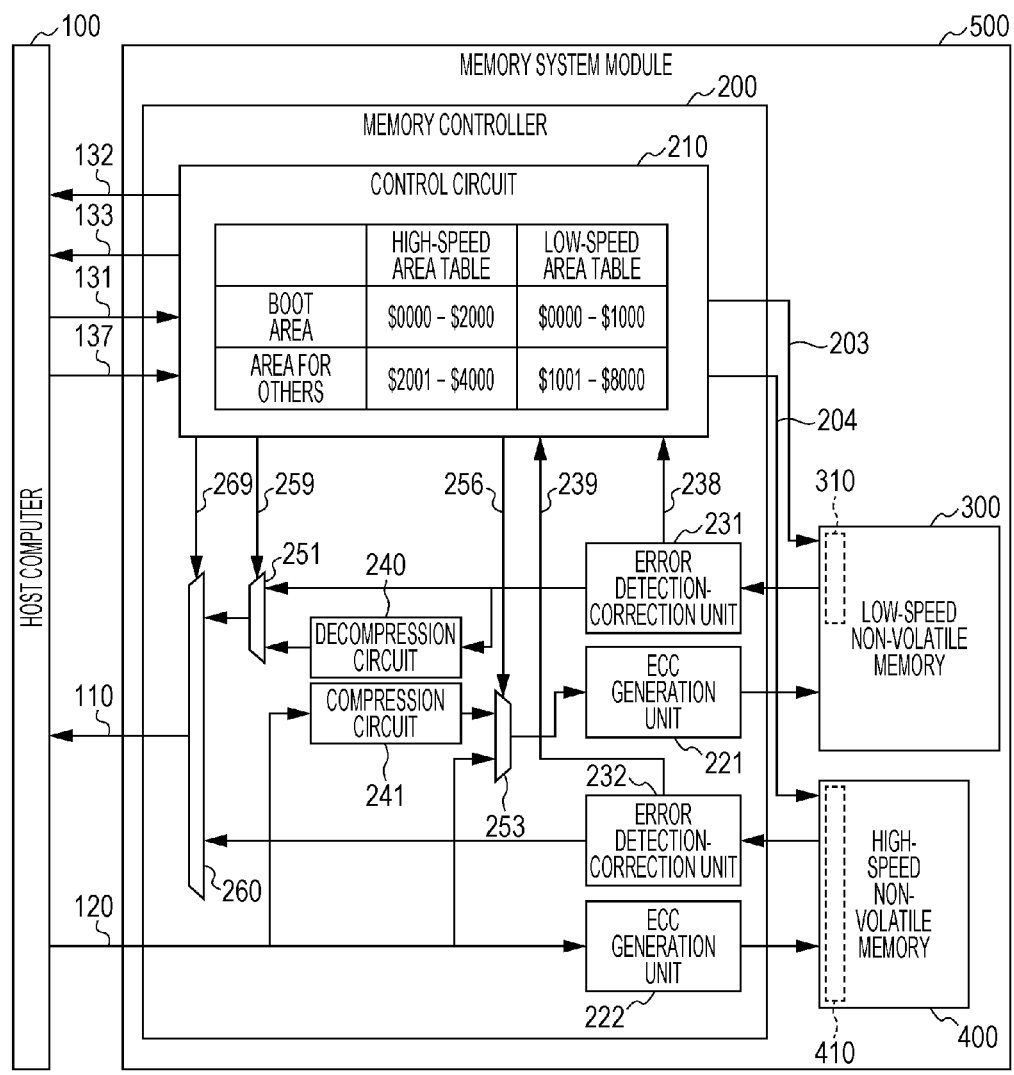
FIG. 7 is a diagram illustrating a configuration example of a memory system module in a third embodiment of the present application.

FIG. 7 is a diagram illustrating a configuration example of the memory system module 500 in the third embodiment of the present application.

The memory system module 500 in the third embodiment includes signal lines 110, 120, 131 to 133, and 137 as interfaces between the host computer 100 and the memory system module 500. The signal lines 110, 120, and 131 to 133 are similar to those in the first embodiment. The signal line 137 is used for the instruction for writing the startup information from the host computer 100.

The memory system module 500 in the third embodiment includes a selector 253 instead of the selector 252 and includes a new compression circuit 241, which is a point different from that of the first embodiment. However, in other points, the memory system module 500 in the third embodiment includes a configuration basically similar to that in the first embodiment.

The compression circuit 241 is a circuit that compresses the written data supplied via the signal line 120. The selector 253 selects any one of the data compressed by the compression circuit 241 or the data not compressed. The selection signal of the selector 253 is supplied from the control circuit 210 via the signal line 256. The output of the selector 253 is supplied to the ECC generation unit 221.

In the third embodiment, the control circuit 210 performs the selection control of the selector 253 via the signal line 256. The other points are similar to the case in the first embodiment.

Operation of the Memory System Module

In the third embodiment, the procedure of the startup information acquisition processing is similar to that in the first embodiment.

Figure 8:
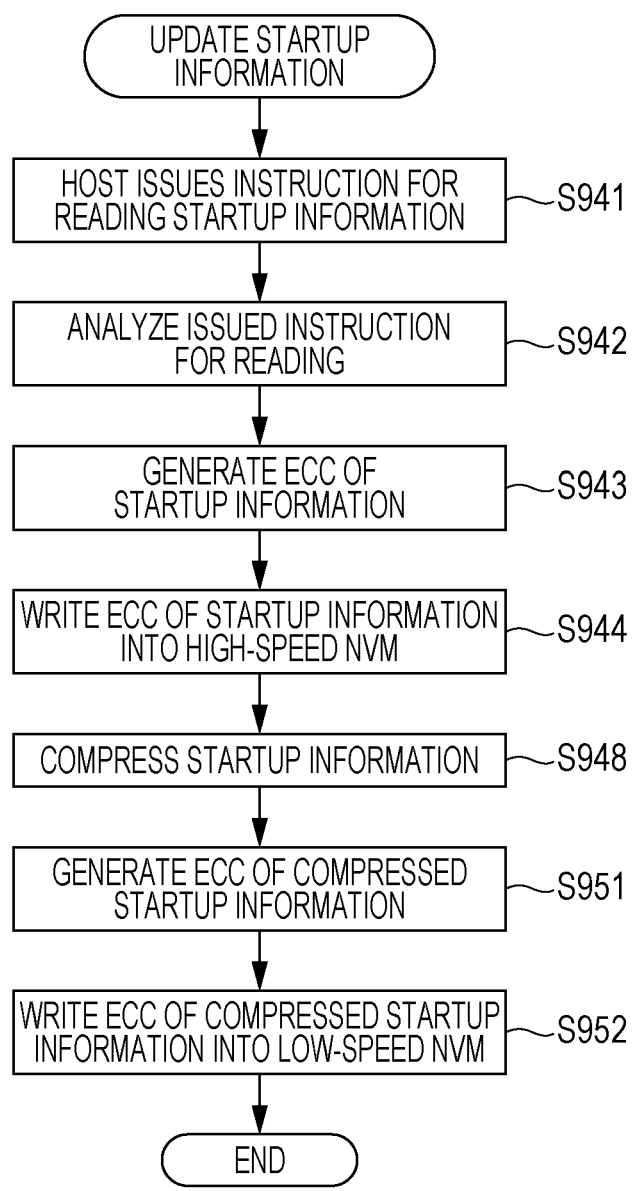
FIG. 8 is a flow chart illustrating an example of a procedure of startup information update processing of the memory system module in the third embodiment of the present application.

FIG. 8 is a flow chart illustrating an example of a procedure of startup information update processing of the memory system module 500 in the third embodiment of the present application.

First, the host computer 100 issues an instruction for writing the startup information and transmits the updated startup information to the memory system module 500 (STEP S941). The control circuit 210 analyzes the instruction to write the startup information issued from the host computer 100 (STEP S942).

Writing the startup information into the high-speed non-volatile memory 400 is performed in the procedure as follows. The startup information output from the host computer 100 is supplied to the ECC generation unit 221 as it is via the selector 253. The ECC generation unit 221 generates the ECC of the startup information (STEP S943). Then, the control circuit 210 controls such that the generated ECC is written into the high-speed non-volatile memory 400 (STEP S944).

Writing the startup information into the low-speed non-volatile memory 300 is performed in the procedure as follows. The compression circuit 241 performs the compression processing with respect to the startup information issued from the host computer 100 (STEP S948). The compressed startup information is supplied to the ECC generation unit 221 via the selector 253. The ECC generation unit 221 generates the ECC of the startup information (STEP S951). Then, the generated ECC is written into the low-speed non-volatile memory 300 (STEP S952).

In the example, it is assumed that the writing of the generated ECC into the high-speed non-volatile memory 400 and into the low-speed non-volatile memory 300 is sequentially performed. However, both may be performed in parallel. That is, STEPs S943 and S944, and STEPs S948, S951 and S952 may be performed mutually in parallel.

In addition, in the example, it is assumed that all of the startup information from the host computer 100 is input. However, only an update file which indicates a part to be updated may be input. In this case, an address of the backup 310 corresponding to the updated part of the startup information 410 is acquired by way of referring to the correspondence table. At this time, in a case where the data size is changed, the correspondence table is updated.

In addition, similarly, also in a case where only the updated page is input, the address of the backup 310 corresponding to the updated page of the startup information 410 is acquired by way of referring to the correspondence table. At this time, in a case where the data size is changed, the correspondence table is updated.

In addition, similarly, also in a case where all of the startup information is input, and is compressed and backed up for each type of file, the address of the backup 310 corresponding to the file is acquired by way of referring to the correspondence table one file by one file. At this time, in a case where the data size is changed, the correspondence table is updated.

In addition, similarly, also in a case where all of the startup information is input, and is compressed and backed up for each page, the address of the backup 310 corresponding to the page is acquired by way of referring to the correspondence table one page by one page. At this time, in a case where the data size is changed, the correspondence table is updated.

In this way, according to the third embodiment of the present application, it is possible to update the startup information 410 and the backup 310.

MODIFICATION EXAMPLE

In the example, in a case where the size of the startup information is not decreased by a compression algorithm, the startup information may be written into the low-speed non-volatile memory 300 without the compression. In this case, it can be considered to indicate whether the startup information is compressed or not by holding a compression flag that indicates whether the startup information is compressed or not at the header of the backup 310. In addition, the compression flag may be included in the correspondence table. In addition, the compression flag may be managed as the management information other than above. At the time of reading, by the control circuit 210 controlling the selector 253 referring to the compression flag, it is possible to output the startup information backup without passing through the compression circuit 241.

In addition, the host computer 100 may issue an instruction for a comparison check of the compressed backup in the low-speed non-volatile memory 300 and the non-compressed information in the high-speed non-volatile memory 400. The third embodiment, in addition to the case of the first embodiment, in a case where the compressed backup is damaged, is assumed to include a function of rewriting the compressed backup in the low-speed non-volatile memory 300 by compressing the startup information stored in the high-speed non-volatile memory 400. That is, in a case where the error detection-correction processing of the low-speed non-volatile memory 300 fails or other defects in reading occur, the compressed backup in the low-speed non-volatile memory 300 may be rewritten by compressing the startup information read from the high-speed non-volatile memory 400.

The modification example described here can be applied to the other embodiments.

4. FOURTH EMBODIMENT

In the third embodiment described above, the memory controller 200 leads the performing of the update of the startup information. However, in the fourth embodiment, the startup information is acquired according to the instruction from the host computer 100.

Configuration of the Memory System Module

Figure 9:
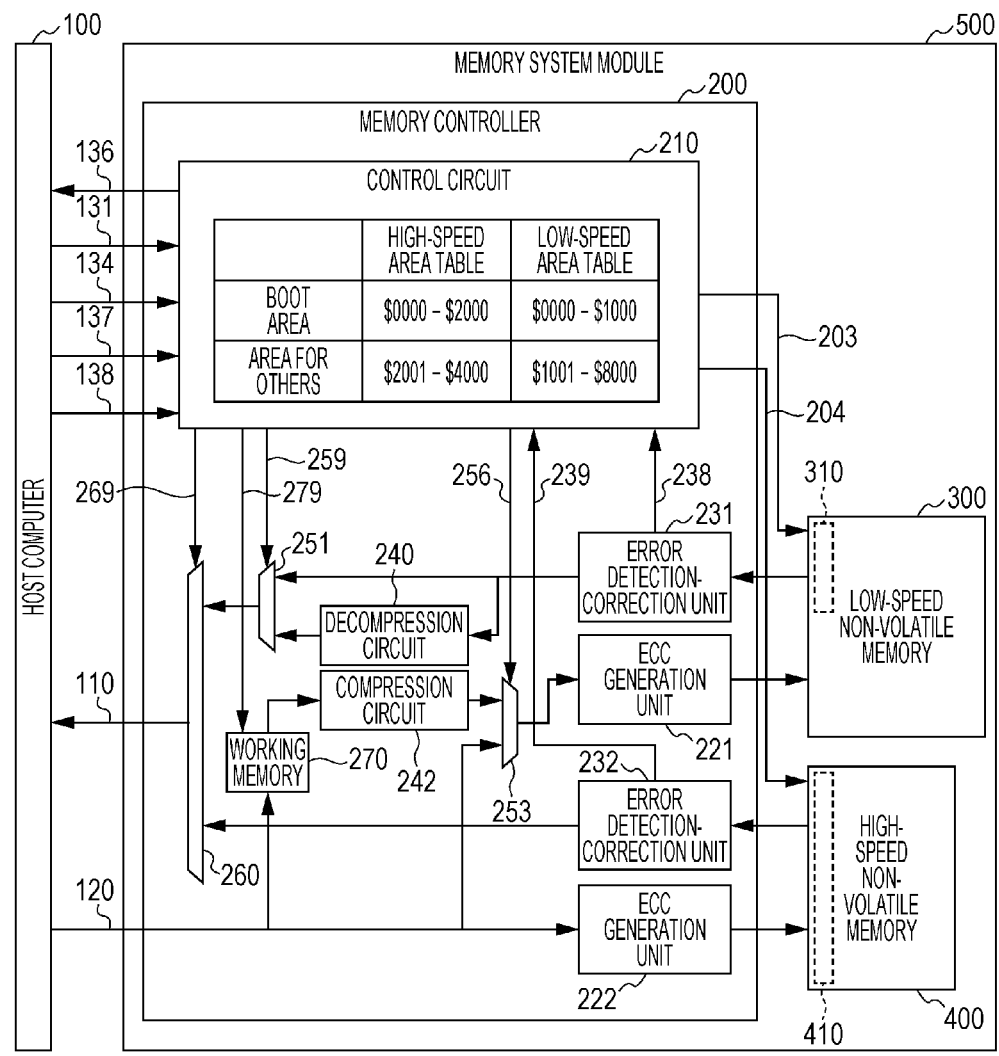
FIG. 9 is a diagram illustrating a configuration example of a memory system module in a fourth embodiment of the present application.

FIG. 9 is a diagram illustrating a configuration example of the memory system module 500 in the fourth embodiment of the present application.

The memory system module 500 in the fourth embodiment includes signal lines 110, 120, 131, 134, and 136 to 138 as interfaces between the host computer 100 and the memory system module 500. The signal lines 110, 120, and 131 are similar to those in the first embodiment. In addition, the signal lines 134 and 136 are similar to those in the second embodiment. In addition, the signal line 137 is similar to that in the third embodiment. The signal line 138 is used for the instruction for reading the backup from the host computer 100. In the fourth embodiment, the signal line 135 provided for the instruction for repairing the startup information in the second embodiment is substituted with the signal line 137 provided for the instruction for writing the startup information.

The memory system module 500 in the fourth embodiment includes the selector 253 instead of the selector 252, and includes a new compression circuit 242, which is a point different from that of the second embodiment. However, in other points, the memory system module 500 in the fourth embodiment includes a configuration basically similar to that in the second embodiment.

The compression circuit 242 is a circuit that compresses the written data held in the working memory 270. The selector 253 selects any one of the written data compressed by the compression circuit 242 and the written data supplied via the signal line 120. The selection signal of the selector 253 is supplied from the control circuit 210 via the signal line 256. The output of the selector 253 is supplied to the ECC generation unit 221.

In the fourth embodiment, the control circuit 210 performs a selection control of the selector 253 via the signal line 256. The other points are similar to the case in the second embodiment.

Operation of the Memory System Module

In the fourth embodiment, the processing procedure of the startup information acquisition processing is similar to that in the second embodiment.

Figure 10:
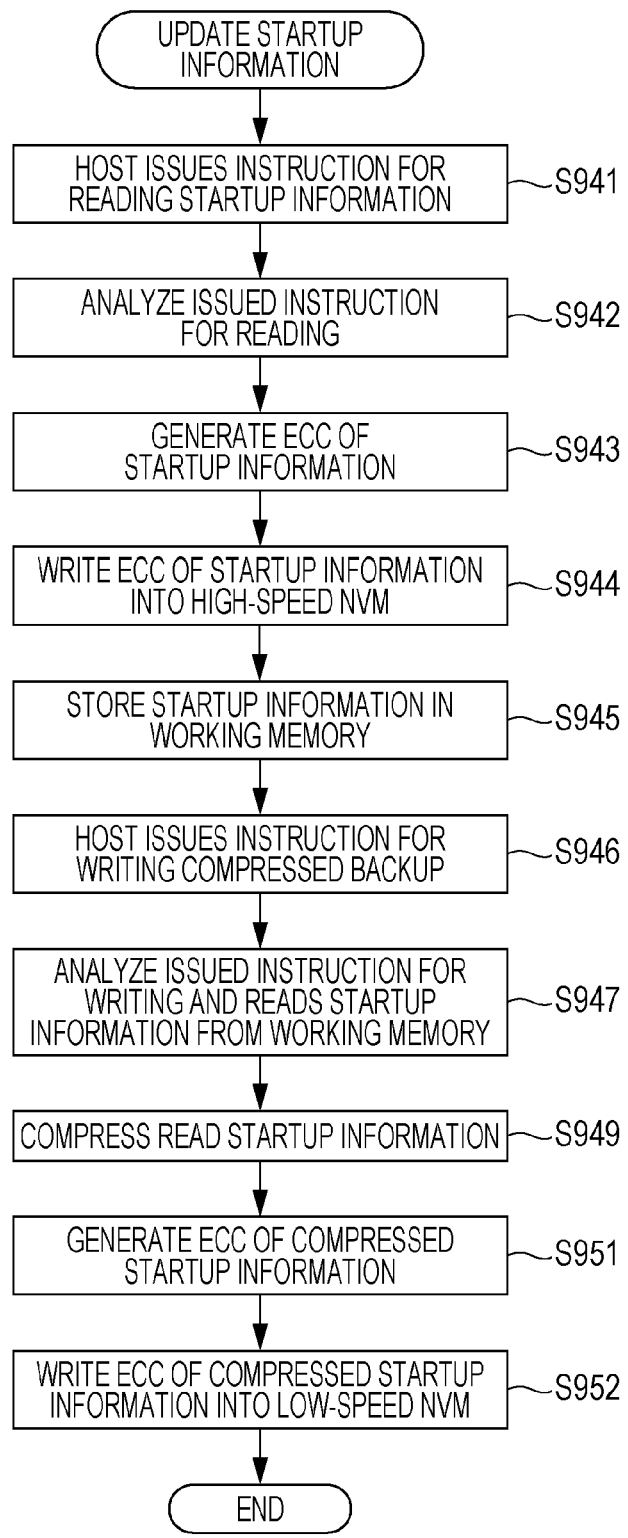
FIG. 10 is a flow chart illustrating an example of a procedure of a startup information update processing of the memory system module in the fourth embodiment of the present application.

FIG. 10 is a flow chart illustrating an example of a procedure of the startup information update processing of the memory system module 500 in the fourth embodiment of the present application.

With regard to the instruction (STEP S941) for writing the startup information from the host computer 100, the processing procedure until the write processing (STEP S944) into the high-speed non-volatile memory 400 is performed is similar to the case in the third embodiment.

Writing the startup information into the low-speed non-volatile memory 300 is performed in the procedure as follows. The control circuit 210 controls the working memory 270 via the signal line 279, and writes the startup information output from the host computer 100 into the working memory 270 (STEP S945). Then, the host computer 100 issues an instruction for writing the backup via the signal line 138 (STEP S946). The control circuit 210 which analyzes the instruction controls the working memory 270 via the signal line 279 and reads the startup information from the working memory 270 (STEP S947). The compression circuit 242 compresses the read startup information (STEP S949). The compressed startup information is supplied to the ECC generation unit 221 via the selector 253. The ECC generation unit 221 generates the ECC of the startup information (STEP S951). Then, the generated ECC is written into the low-speed non-volatile memory 300 (STEP S952).

In the example, it is assumed that the writing of the generated ECC into the high-speed non-volatile memory 400 and into the low-speed non-volatile memory 300 is sequentially performed. However, both may be performed in parallel. That is, STEPs S943 and S944, and STEPs S945 to S952 may be performed mutually in parallel.

In this way, according to the fourth embodiment of the present application, the host computer 100 can lead the performing of the update processing of the startup information 410 and the backup 310.

5. FIFTH EMBODIMENT

In the third and fourth embodiment described above, at the time of updating the backup 310, the updated backup 310 is overwritten and one remains at all times, however, in the fifth embodiment, the history of the backup remains in the low-speed non-volatile memory 300.

Configuration of the Memory System Module

Figure 11:
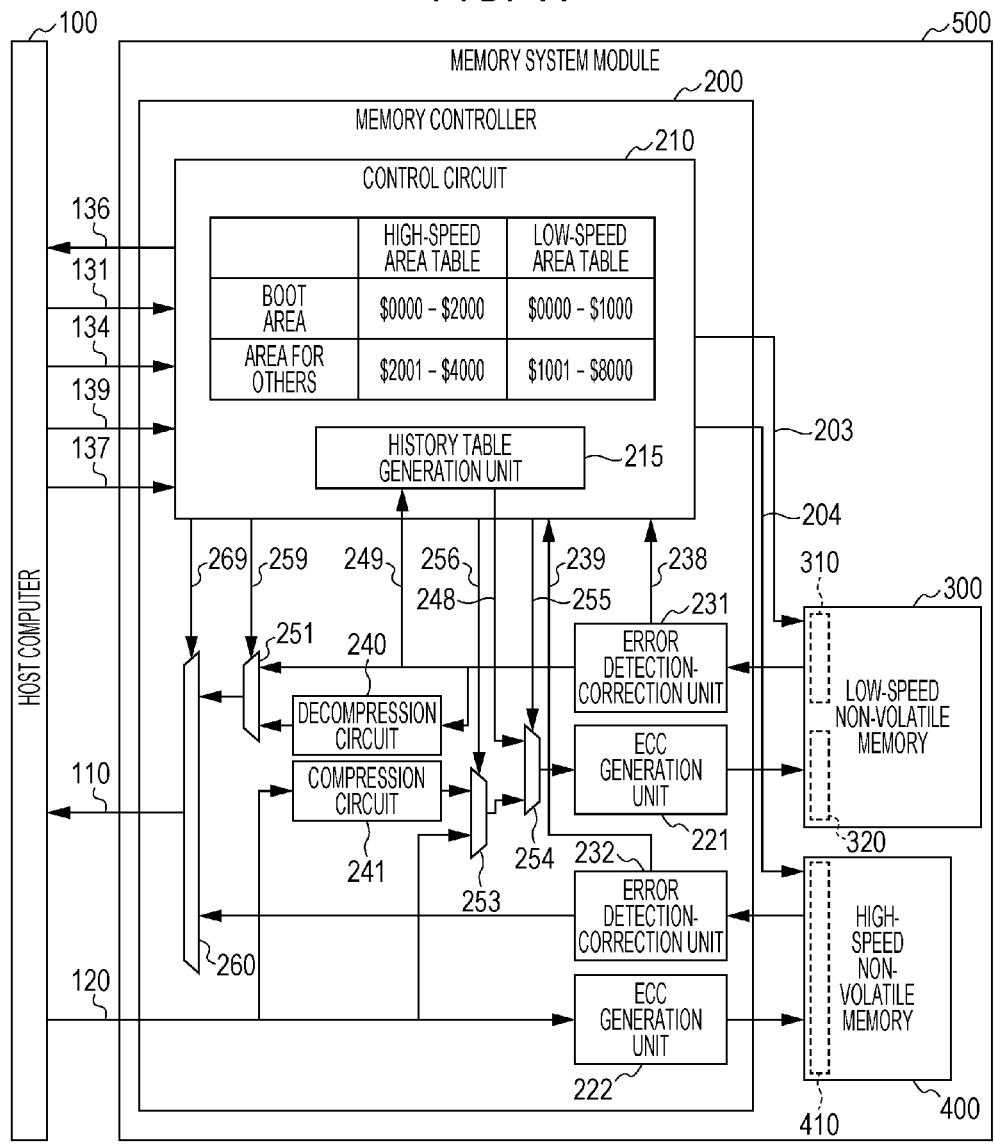
FIG. 11 is a diagram illustrating a configuration example of a memory system module in a fifth embodiment of the present application.

FIG. 11 is a diagram illustrating a configuration example of a memory system module 500 in a fifth embodiment of the present application.

The memory system module 500 in the fifth embodiment includes signal lines 110, 120, 131, 134, 136, 137 and 139 as interfaces between the host computer 100 and the memory system module 500. The signal lines 110, 120, and 131 are similar to those in the first embodiment. In addition, the signal lines 134 and 136 are similar to those in the second embodiment. In addition, the signal line 137 is similar to that in the third embodiment. The signal line 139 is used for the instruction for reading the history table from the host computer 100.

In the fifth embodiment, differently from the third and fourth embodiments, a plurality of compressed backups is stored in the low-speed non-volatile memory 300 as a history table 320. In addition, the host computer 100 has a function of recognizing that the memory system module 500 stores the plurality of compressed backups. In addition, the host computer 100 has a function of designating an arbitrary version through the history table output from the memory system module 500. The history table includes information with which the host computer 100 can recognize features of the compressed backup such as a version number or the updated time of the plurality of compressed backups. In addition, the history table includes address information which indicates addresses where the respective compressed backups are stored in the boot area of the low-speed non-volatile memory 300.

The memory system module 500 in the fifth embodiment includes a history table generation unit 215 and a selector 254, which is a point different from that in the third embodiment. However, in other points, the memory system module 500 in the fifth embodiment includes a configuration basically similar to that in the third embodiment.

The history table generation unit 215 appends the history such as the version number of the backup with respect to the history table held in the boot area of the low-speed non-volatile memory 300 when the compressed backup 310 in the low-speed non-volatile memory 300 is updated. If there is no area in the boot area of the low-speed non-volatile memory 300 to store the backup of new startup information, the history table generation unit 215 automatically overwrites the oldest version. In addition, it may also be possible to secure the writing area by the host computer 100 specifying where to write and overwriting the existing version.

The selector 254 selects any of the history tables generated by the history table generation unit 215 and supplied via the signal line 248 or the output of the selector 253, and supplies the selected one to the ECC generation unit 221. The control with respect to the selector 254 is performed by the control circuit 210 via the signal line 255.

In the fifth embodiment, the control circuit 210 notifies the host computer 100 of the state of the memory system module 500 through the startup information reading failure flag. In addition, the control circuit 210 controls the selection processing in the selector 254 via the signal line 255.

Operation of the Memory System Module

FIG. 12A and FIG. 12B are flow charts illustrating an example of a procedure of the startup information acquisition processing of the memory system module 500 in the fifth embodiment of the present application.

With regard to the instruction (STEP S811) for reading the startup information from the host computer 100, the processing procedure until the startup processing (STEP S816) in a case where the startup information is normally acquired is performed, is similar to that (STEP S911 to S916) in the first embodiment.

In a case where the detection-correction processing fails (No in STEP S814), the control circuit 210 notifies the host computer 100 via the signal line 136 of the startup information reading failure flag which indicates that the reading of the startup information has failed (STEP S817). In response to this, the host computer 100 issues an instruction for reading the history table from the low-speed non-volatile memory 300 via the signal line 139 to the memory system module 500 (STEP S818). The control circuit 210 which analyzes the instruction controls the reading of the history table from the low-speed non-volatile memory 300 (STEP S819). The error detection-correction unit 231 performs error detection-correction processing of the history table read from the low-speed non-volatile memory 300 and notifies the control circuit 210 of the success or failure of the detection-correction processing via the signal line 238 (STEP S821).

In a case where the detection-correction processing is successful (Yes in STEP S822), the control circuit 210 controls the selectors 251 and 269 via the signal lines 259 and 269, and outputs the history table to the host computer 100 as the startup information (STEP S831). Subsequently, the host computer 100 selects one version of the compressed backup from the history table and issues an instruction for reading the backup together with the designated version via the signal line 134 (STEP S832). The control circuit 210 analyzes the instruction for reading the backup and performs the control of reading the designated version (STEP S833). The error detection-correction unit 231 performs the error detection-correction processing for the read backup, and notifies the control circuit 210 of the success or failure of the error detection-correction processing via the signal line 238 (STEP S834).

In a case where the detection-correction processing is successful (Yes in STEP S835), control circuit 210 controls the selectors 251 and 260 via the signal lines 259 and 269, and outputs the output of the decompression circuit 240 to the host computer 100 as the startup information (STEP S836). In addition, the ECC generation unit 222 generates the ECC of the compressed backup startup information which is decompressed by the decompression circuit 240 (STEP S837). The control circuit 210 writes the ECC generated by the ECC generation unit 222 into the high-speed non-volatile memory 400 in order to repair the startup information 410 of the high-speed non-volatile memory 400 (STEP S838). As a result, the host computer 100 performs the startup using the startup information output in STEP S836 (STEP S816).

In a case where the detection-correction processing fails (No in STEP S822 or S835), the control circuit 210 notifies the host computer 100 that the reading of the backup has failed and the repair of the startup information has failed via the signal line 136 (STEP S823). As a result, the host computer 100 notifies the user that the startup processing has failed and the startup is not possible (STEP S824).

Figure 13A:
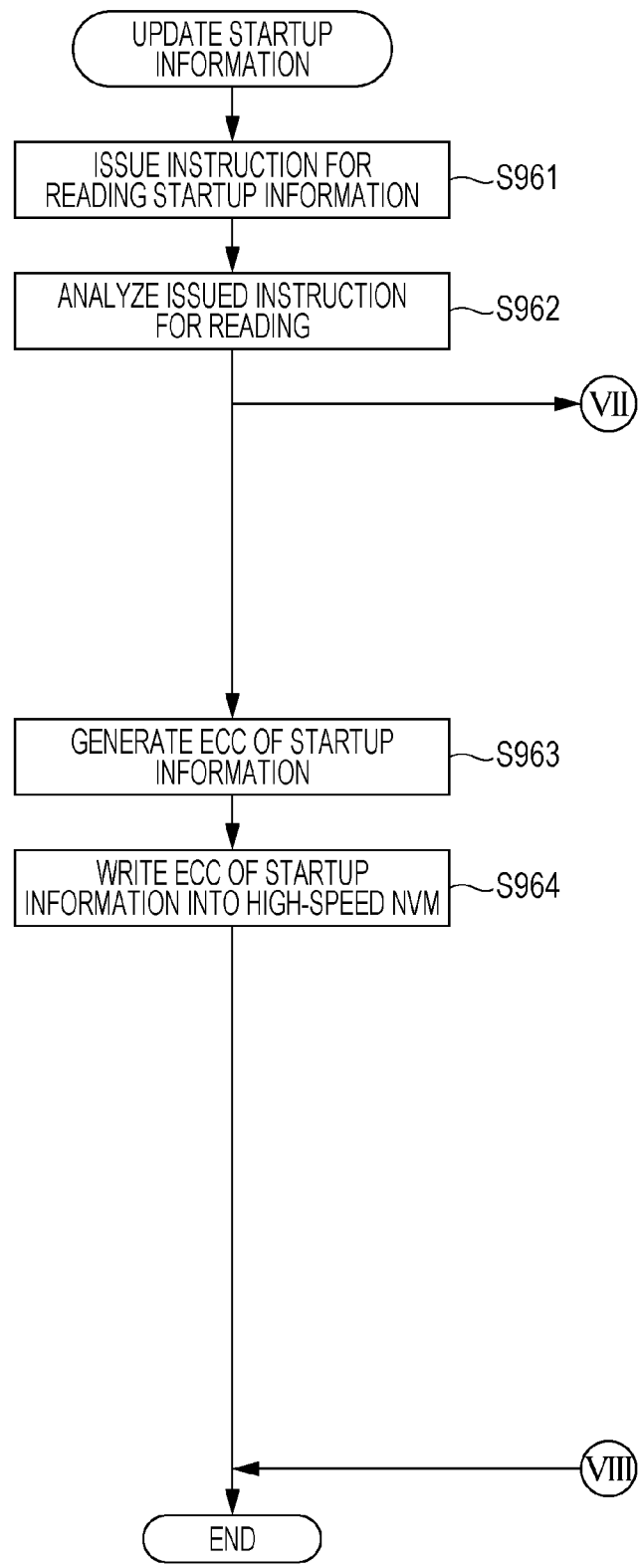

FIG. 13A and FIG. 13B are flow charts illustrating an example of a procedure of a startup information update processing of the memory system module 500 in the fifth embodiment of the present application.

With regard to the instruction (STEP S961) for writing the startup information from the host computer 100, the processing procedure until the write processing (STEP S964) into the high-speed non-volatile memory 400 is performed, is similar to that (STEP S941 to S944) in the third embodiment.

In FIG. 13A and FIG. 13B, it is assumed that the writing into the high-speed non-volatile memory 400 and the writing into the low-speed non-volatile memory 300 are performed in parallel. The writing into the low-speed non-volatile memory 300 is performed in the following procedure. The compression circuit 241 performs the compression of the startup information issued by the host computer 100 (STEP S965). At this time, the control circuit 210 controls the signal lines 255 and 256 such that the compressed startup information is input to the ECC generation unit 221. The control circuit 210 controls the reading of the history table from the low-speed non-volatile memory 300 (STEP S966). The error detection-correction unit 231 performs the error detection-correction on the history table read from the low-speed non-volatile memory 300, and notifies control circuit 210 of the success or failure of the error detection-correction processing via the signal line 238 (STEP S967).

In a case where the detection-correction processing is successful (Yes in STEP S968), the history table generation unit 215 checks whether there is a free space in the boot area of the low-speed non-volatile memory 300 from the history table (STEP S969). In a case where there is free space for additional writing in capacity (Yes in STEP S969), the history table generation unit 215 additionally writes the version number, the time, and the address in the boot area of the newly written compressed backup, into the history table (STEP S971). In a case where the compressed backup is for each file or for each page, only the address of the start point is stored in the history table and the correspondence relationship with the detail addresses is stored in the correspondence table. On the other hand, in a case where there is no free space for additional writing in capacity (No in STEP S969), the history table generation unit 215 determines the oldest history information from the history table, and overwrites the version number, the time, and the address in the boot area of the newly written compressed backup, into the history table (STEP S972).

In a case where the detection-correction processing fails (No in STEP S968), the history table generation unit 215 stores the version number, the time, and the address in the boot area of the newly written compressed backup, in the initial history area determined in advance by the specification and the like among the history tables (STEP S973). That is, since the history up to now is lost due to the failure of the error correction processing, the same processing as that of recreating a new history table is performed.

After storing the history in any of STEPs S971 to S973, the startup information compressed in STEP S965 is supplied to the ECC generation unit 221 via the selectors 253 254. The ECC generation unit 221 generates the ECC of the compressed startup information (STEP S974). Then, the control circuit 210 writes the generated ECC into the low-speed non-volatile memory 300 (STEP S975).

The control circuit 210 controls the signal line 255 and inputs the history table to the ECC generation unit 221 (STEP S976). The ECC generation unit 221 generates the ECC of the history table (STEP S977). Then, the generated ECC is written into the low-speed non-volatile memory 300 (STEP S978).

In the example, it is assumed that the writing of the generated ECC into the high-speed non-volatile memory 400 and the writing the generated ECC into the low-speed non-volatile memory 300 are performed in parallel. However, both may be sequentially performed.

In addition, in a case where there is no free space in the boot area, the oldest history is overwritten (STEP S972). However, the host computer 100 may receive a notification from the memory system module 500 that there is no free space, and may have a function of designating an overwriting area.

In addition, in the example, the startup processing of the host computer 100 is performed after the boot area of the high-speed non-volatile memory 400 is repaired. However, the repair of the boot area of the high-speed non-volatile memory 400 and the startup processing of the host computer 100 may be performed in parallel.

In addition, in the example, when the error detection-correction processing for the backup fails, it is regarded as the failure of the repair. However, since a plurality of backups is held, the host computer 100 may designate another version and try to repair it.

In this way, according to the fifth embodiment of the present application, it is possible to store the history of the backup of the startup information in the low-speed non-volatile memory 300.

MODIFICATION EXAMPLE

In the example, in a case where there is no free space in the boot area of the low-speed non-volatile memory 300, the oldest history is automatically overwritten. However, the overwriting area may be designated by the host computer 100. In this case, the memory system module 500 has a function of notifying the host computer 100 that there is no free space. In addition, the host computer 100 has a function of instructing the memory system module 500 to designate the version to be overwritten from the history table after receiving the notification.

In addition, in the example, the history table is stored in the low-speed non-volatile memory 300, but may be stored in the high-speed non-volatile memory 400. In addition, in a case where the memory system module 500 has another recording medium, the history table may be stored in that recording medium.

The modification example described here can be applied to other embodiments.

6. SIXTH EMBODIMENT

In the fifth embodiment described above, the memory controller 200 leads the storing of the history of the backup in the low-speed non-volatile memory 300. However, in the sixth embodiment, the history of the backup is stored according to the instruction from the host computer 100.

Configuration of the Memory System Module

Figure 14:
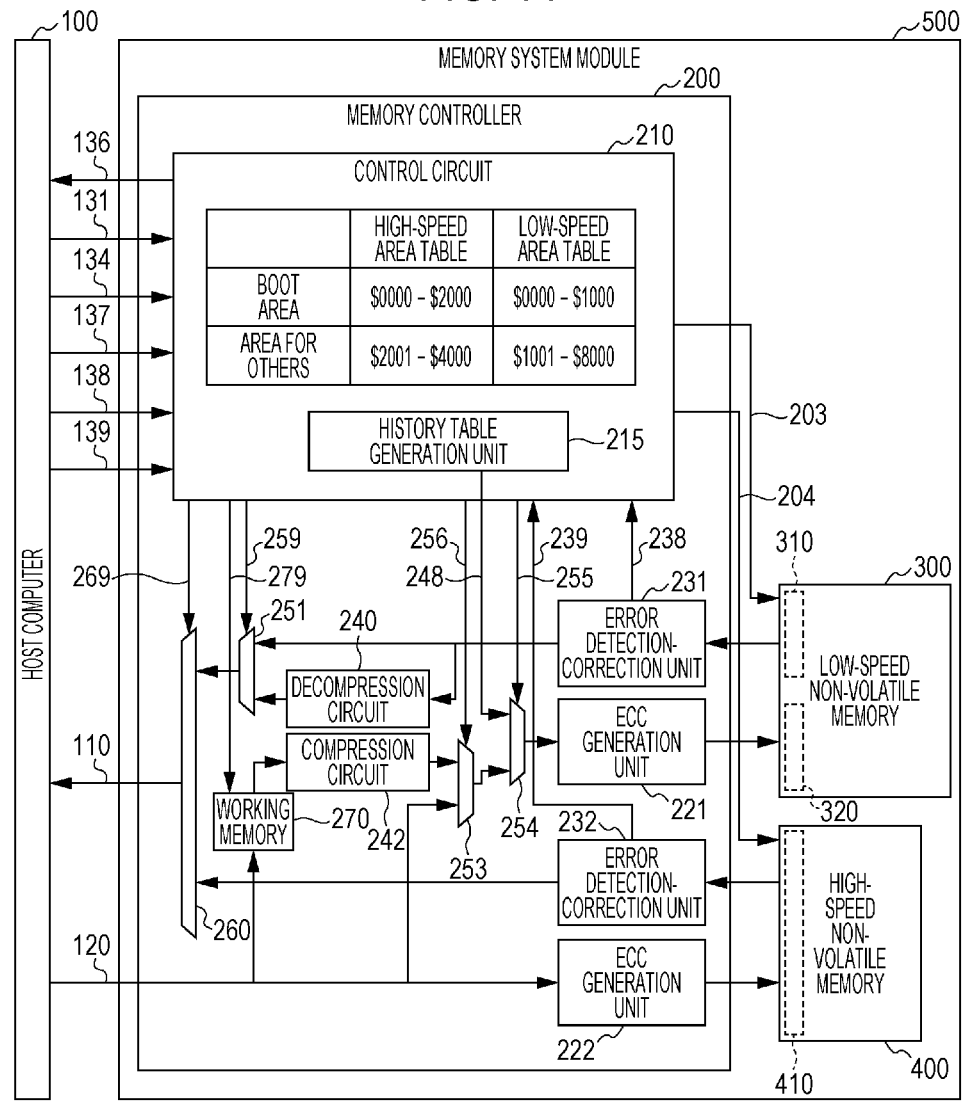
FIG. 14 is a diagram illustrating a configuration example of a memory system module in a sixth embodiment of the present application.

FIG. 14 is a diagram illustrating a configuration example of the memory system module 500 in the sixth embodiment of the present application.

The memory system module 500 in the sixth embodiment includes signal lines 110, 120, 131, 134, and 136 to 139 as interfaces between the host computer 100 and the memory system module 500. The signal lines 110, 120, and 131 are similar to those in the first embodiment. In addition, the signal lines 134 and 136 are similar to those in the second embodiment. In addition, the signal line 137 is similar to that in the third embodiment. In addition, the signal line 138 is similar to that in the fourth embodiment. In addition, the signal line 139 is similar to that in the fifth embodiment.

The memory system module 500 in the sixth embodiment includes the working memory 270, which is a point different from the fifth embodiment, and in other points, the memory system module 500 in the sixth embodiment includes a configuration basically similar to that in the fifth embodiment. The working memory 270 is a memory having the same function as the memories in the second and fourth embodiments.

In the sixth embodiment, the control circuit 210 has a function of automatically recognizing the boot area of the low-speed non-volatile memory 300 corresponding to the boot area of the high-speed non-volatile memory 400 based on the correspondence table read from the low-speed non-volatile memory 300.

Operation of the Memory System Module

In the sixth embodiment, the processing procedure of the startup information acquisition processing is similar to that in the fifth embodiment. In addition, in the sixth embodiment, in the startup information update processing of the memory system module 500, since there is no desire to link the update of the startup information of the high-speed non-volatile memory 400 and the storage of the compressed backup in the low-speed non-volatile memory 300, those will be separately described.

Figure 15:
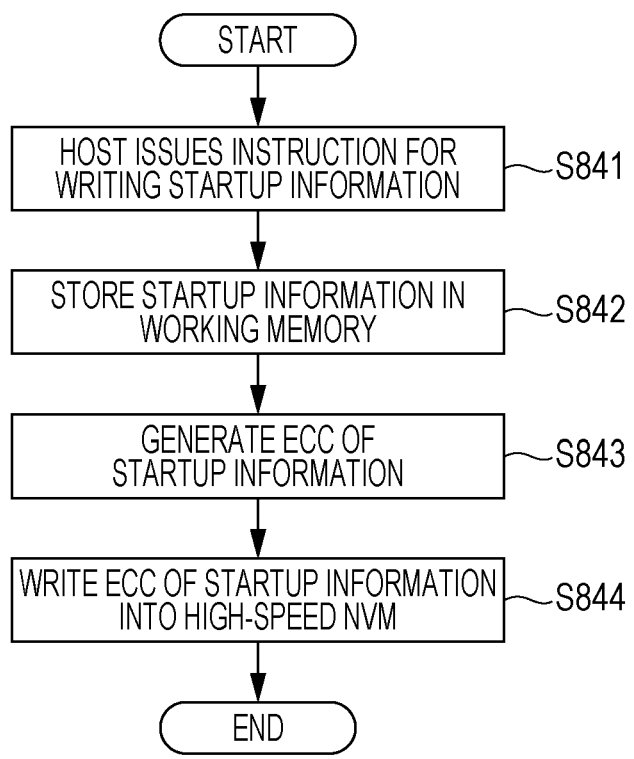
FIG. 15 is a flow chart illustrating an example of a procedure of a startup information update processing of a high-speed non-volatile memory in the sixth embodiment of the present application.

FIG. 15 is a flow chart illustrating an example of a procedure of the startup information update processing of the high-speed non-volatile memory 400 in the sixth embodiment of the present application.

First, the host computer 100 issues an instruction for writing the startup information and transmits the updated startup information to the memory system module 500 (STEP S841). The control circuit 210 analyzes the instruction for writing the startup information issued from the host computer 100, and writes the startup information into the working memory 270 (STEP S842). The ECC generation unit 222 generates the ECC of the startup information (STEP S843). Then, the control circuit 210 controls such that the generated ECC is written into the high-speed non-volatile memory 400 (STEP S844).

Figure 16:
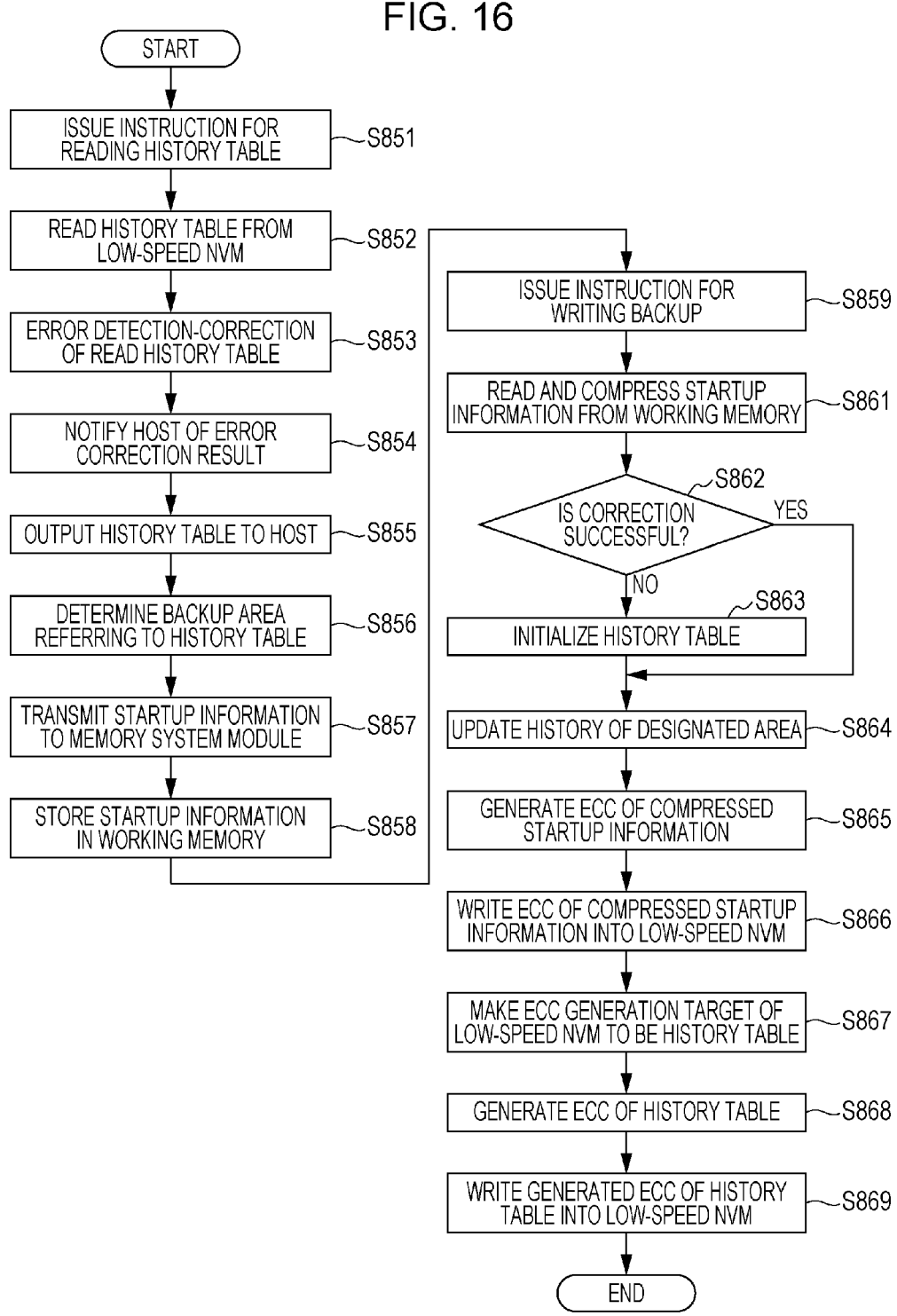
FIG. 16 is a flow chart illustrating an example of a procedure of a backup storage processing of a low-speed non-volatile memory in the sixth embodiment of the present application.

FIG. 16 is a flow chart illustrating an example of a procedure of the backup storage processing of a low-speed non-volatile memory 300 in the sixth embodiment of the present application.

First, the host computer 100 issues an instruction for reading the history table (STEP S851). The control circuit 210 performs the control of the reading of the history table from the low-speed non-volatile memory 300 (STEP S852). The error detection-correction unit 231 performs the error detection-correction processing for the history table read from the low-speed non-volatile memory 300, and notifies the control circuit 210 of the success or failure of the detection-correction processing via the signal line 238 (STEP S853). Based on the notification, the control circuit 210 notifies the host computer 100 of the success or failure of the detection-correction processing (STEP S854). Then, the control circuit 210 performs the output control of the history table to the host computer 100 (STEP S855). The host computer 100 determines the writing area of the backup referring to the history table (STEP S856).

The host computer 100 transmits the startup information to the memory system module 500 (STEP S857). Then, the control circuit 210 stores the startup information transmitted from the host computer 100 in the working memory 270 (STEP S858). These STEPs S857 and S858 can be omitted if the startup information is stored already in STEP S842.

The host computer 100 designates the writing area of the backup and issues the instruction for writing the backup via the signal line 138 (STEP S859). The control circuit 210 reads the startup information stored in the working memory 270 and causes the compression circuit 242 to compress the startup information (STEP S861).

In a case where the detection-correction processing in STEP S853 fails (No in STEP S862), the control circuit 210 initializes the history table (STEP S863). The control circuit 210 updates the history of the area designated by the host computer 100 (STEP S864). The ECC generation unit 221 generates the ECC of the startup information compressed in STEP S861 (STEP S865). Then, the control circuit 210 writes the generated ECC into the low-speed non-volatile memory 300 (STEP S866).

The control circuit 210 controls the signal line 255 and inputs the history table to the ECC generation unit 221 (STEP S867). The ECC generation unit 221 generates the ECC of the history table (STEP S868). Then, the control circuit 210 writes the generated ECC into the low-speed non-volatile memory 300 (STEP S869).

In this way, according to the sixth embodiment of the present application, the host computer 100 can lead the performing of the storage processing of the backup of the startup information.

7. MODIFICATION EXAMPLES

First Modification Example

In each of the embodiments described above, it is assumed that the control circuit 210 holds the correspondence table that indicates the correspondence relationship of the areas in the low-speed non-volatile memory 300 and the high-speed non-volatile memory 400. However, the correspondence table may be stored in the low-speed non-volatile memory 300. In a first modification example, control circuit 210 can recognize the correspondence relationship of the boot area of the high-speed non-volatile memory 400 and the boot area of the low-speed non-volatile memory 300 from the correspondence table read from the low-speed non-volatile memory 300.

Figure 17:
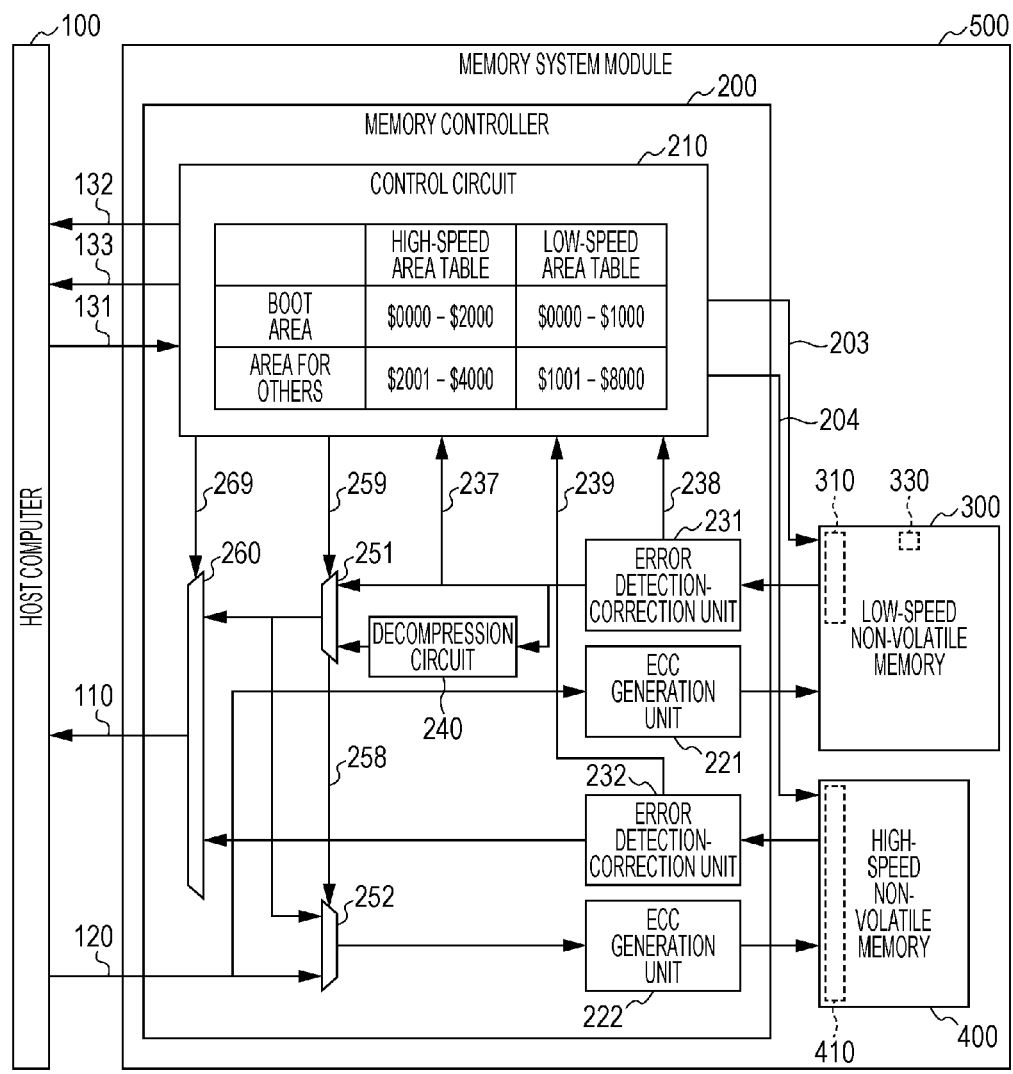
FIG. 17 is a diagram illustrating a configuration example of a memory system module in a first modification example of the present application.

FIG. 17 is a diagram illustrating a configuration example of the memory system module 500 in the first modification example of the present application. The configuration example is based on the first embodiment and has a difference in the point that the correspondence table 330 is stored in the low-speed non-volatile memory 300.

In the first modification example, in a case where the first modification example is based on the first embodiment, processing procedure of reading the correspondence table from the low-speed non-volatile memory 300 and generating the ECC thereof is inserted before the procedure of reading the compressed startup information in STEP S922. Other points are the same as those of the first embodiment.

According to the first modification example, since the generation of the correspondence table at the time of product shipment or thereafter can be accommodated, it is possible to appropriately segment the area based on the product such as the compression algorithm or the size of the startup information.

Figure 18:
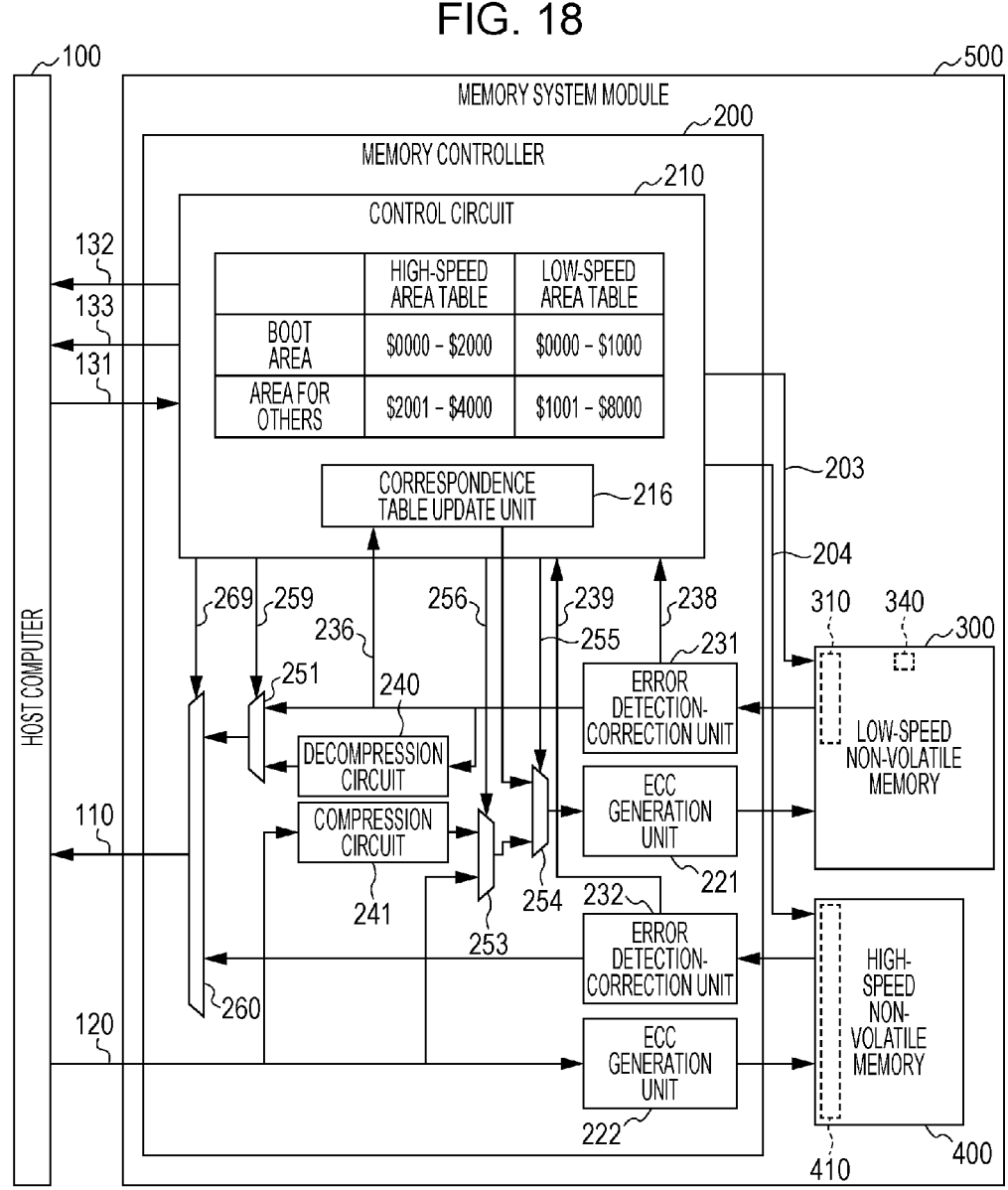
FIG. 18 is a diagram illustrating another configuration example of the memory system module in the first modification example of the present application.

In the first embodiment, since the startup information stored at the time of shipment and the compressed backup are continuously used, there is no change in the correspondence table. In a case where the startup information is updated and there is a change in correspondence table as in the third to sixth embodiments, the correspondence table is desired to be updated and rewritten. The configuration example of the memory system module 500 in the first modification example in that case is illustrated in FIG. 18. The control circuit 210 includes a correspondence table update unit 216 that updates the correspondence table. In addition, the memory controller 200 includes the selector 254 that selects any of the correspondence table from the host computer 100 and the correspondence table from the control circuit 210. The selector 254 is controlled by the signal line 255 from the control circuit 210. If the correspondence table is updated, the correspondence table updated by the correspondence table update unit 216 is written into the low-speed non-volatile memory 300.

In addition, in the first modification example, it is assumed that the correspondence table is stored in the low-speed non-volatile memory 300. However, the correspondence table may be stored in the high-speed non-volatile memory 400 and, in a case where the memory controller 200 includes any non-volatile memory, the non-volatile memory may be used. In addition, in the first modification example, as an error resistance strengthening of the correspondence table, the correspondence table may be stored in both of the low-speed non-volatile memory 300 and the high-speed non-volatile memory 400 similarly to the case of startup information, and in that case, the compressed correspondence table may be stored in the low-speed non-volatile memory 300. In addition, the correspondence table may be protected by a strong ECC in addition to the ordinary ECC.

Second Modification Example

In a second modification example, a strengthened ECC is used as an error resistance strengthening of the backup.

Figure 19:
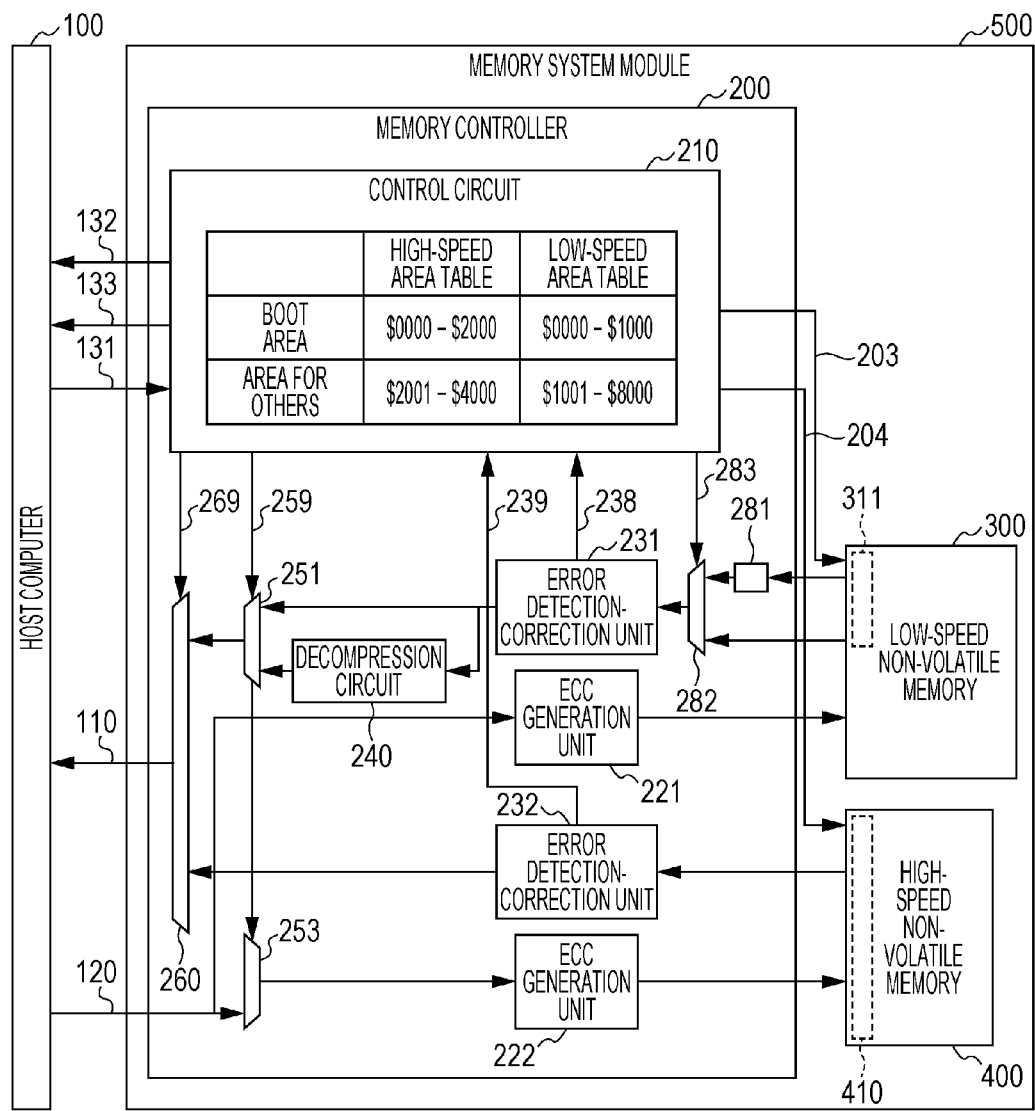
FIG. 19 is a diagram illustrating a configuration example of a memory system module in a second modification example of the present application.

FIG. 19 is a diagram illustrating a configuration example of the memory system module 500 in the second modification example of the present application. The configuration example is based on the first embodiment, and the memory system module 500 further includes a selector 282 that selects any of the data from a strengthened error detection-correction unit 281, and the error detection-correction unit 281 or the low-speed non-volatile memory 300 according to a signal line 283. In addition, the backup 311 in which the strengthened ECC is used is stored in the low-speed non-volatile memory 300.

The error detection-correction unit 281 performs an error detection-correction processing on the backup 311 read from the low-speed non-volatile memory 300. In the example, the error detection-correction unit 281 does not notify the control circuit 210 of the success or failure of the error detection-correction processing. The success or failure of the error detection-correction processing of the read backup 311 is determined in the error detection-correction unit 231.

In the second modification example, in a case where the second modification example is based on the first embodiment, the error detection-correction processing procedure by the error detection-correction unit 281 is inserted before the step of error detection-correction processing of the compressed startup information in STEP S923. Other points are the same as those in the first embodiment.

According to the second modification example, it is possible to protect the compressed and stored backup 311 and to strengthen the error resistance by performing the strengthened error detection-correction processing by the error detection-correction unit 281 in addition to the ordinary error detection-correction processing by the error detection-correction unit 231. Here, since the backup 311 is compressed, there is a space in the area. By the ECC for strengthening being added to the free area vacated by the compressing, it is possible to improve the error resistance compared with that in the case of the backup without compression.

In the second modification example, the error detection-correction unit 281 is disposed in series to the error detection-correction unit 231. However, by disposing the error detection-correction unit 281 and the error detection-correction unit 231 in parallel, a stronger ECC may be used than in the case of the single error detection-correction unit 231. Any other method can be used as long as the method can add the ECC having higher error detection-correction ability than the ECC in the case of the single error detection-correction unit 231.

Third Modification Example

In a third modification example, by adding management information to the compressed and backed up startup information, a state management such as a refreshment processing is performed.

Figure 20:
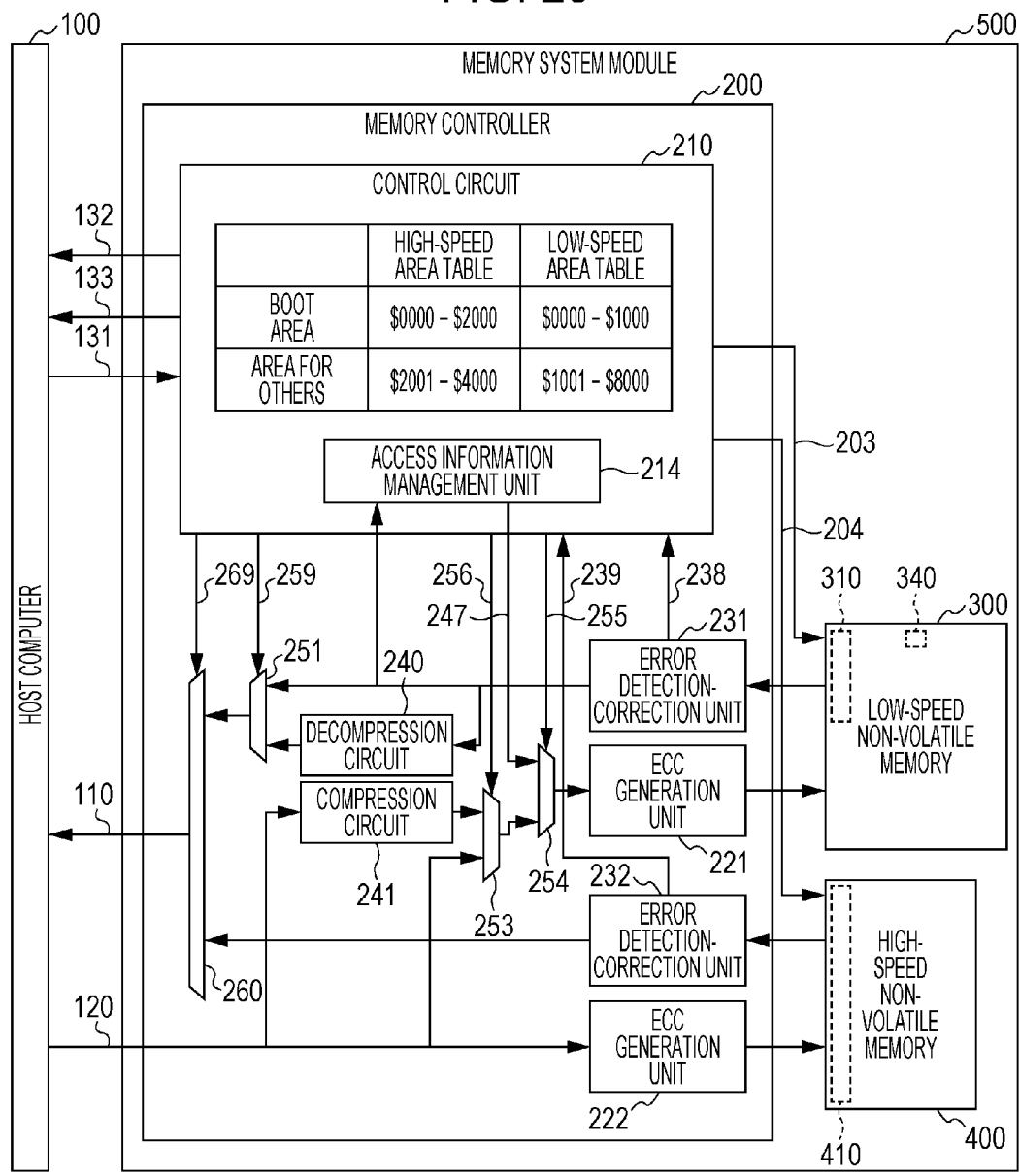
FIG. 20 is a diagram illustrating a configuration example of a memory system module in a third modification example of the present application.

FIG. 20 is a diagram illustrating a configuration example of the memory system module 500 in the third modification example of the present application. The third modification example is based on the first embodiment, and the memory system module 500 includes selectors 253 and 254 instead of the selector 252, and includes a new compression circuit 241 and an access information management unit 214. In addition, the low-speed non-volatile memory 300 includes a storage area for access information 340.

The compression circuit 241 is circuit that compresses the written data supplied via the signal line 120. The selector 253 selects any of the data compressed by the compression circuit 241 or the data not compressed. The selection signal of the selector 253 is supplied via signal line 256 from the control circuit 210.

The selector 254 selects any of the access information generated by the access information management unit 214 and supplied via a signal line 247 or the output of the selector 253, and supplies the selected one to the ECC generation unit 221. The control with respect to the selector 254 is performed by the control circuit 210 via the signal line 255.

The access information management unit 214 generates and manages the access information. The access information is information related to the history accessed with respect to the backup 310, for example, including the final reading time or the read frequency of the backup 310. The access information is stored as initial information at the time of shipment, and when the boot area of the low-speed non-volatile memory 300 is read, the access information is also read and updated, and then written back into the low-speed non-volatile memory 300 again.

Generally, there is refreshment processing, in which a content of the information stored in the non-volatile memory is rewritten, as a method of protection of such information. In the third modification example, in a case where the boot area of the low-speed non-volatile memory 300 is not read for a long time and in a case where the read frequency is large, there is possibility of damage to the content of the stored information. Thus, as described below, by the access information being included in the boot area, it is possible to determine the refreshment being performed using threshold values with respect to the elapsed time and the frequency of the reading from the storage.

In a NAND flash assumed to be the low-speed non-volatile memory 300, there is a case where the damage probability is high as the elapsed time from the storage is long. If the time when the boot area is read is held as the access information, it is possible to estimate the damage probability from the elapsed time. For example, in a case where the number of correctable bits of the ECC is designed based on the damage probability p, if the damage probability exceeds p, there is a possibility of failure in the error correction. On the other hand, if the estimated value of the damage probability in a certain elapsed time is assumed to be q, by setting the elapsed time T having the value of q<p as the threshold value in advance, and performing the refreshment at the time when the elapsed time reaches T, it is possible to protect the stored information.

In a resistance change type memory assumed to be the high-speed non-volatile memory 400, there is a case where the damage probability of the stored information increases as the read frequency increases. If the read frequency of the boot area is held as the access information, it is possible to estimate the damage probability from the read frequency. For example, in a case where the number of correctable bits of the ECC is designed based on the damage probability p, if the damage probability exceeds p, there is a possibility of failure in decoding. On the other hand, if the estimated value of the damage probability after a certain read frequency is assumed to be q, by setting the read frequency N having the value of q<p as the threshold value in advance, and performing the refreshment at the time when the read frequency reaches N, it is possible to protect the stored information.

In the third modification example, in a case where the third modification example is based on the first embodiment, three following processing procedures are inserted before the step of reading the compressed startup information in STEP S922. That is, the processing of reading the access information, processing of determining whether or not to perform the refreshment from the access information, and processing of performing the refreshment if the condition for refreshment is satisfied. The other points are the same as those in the first embodiment.

According to the third modification example, the refreshment processing of the backup stored in the low-speed non-volatile memory 300 can be effectively performed, and thus, it is possible to improve the reliability of the backup and the safety of the system startup.

In the refreshment processing, methods in which the stored information is read and rewritten as it is, or the value obtained after the error correction is rewritten can be considered, and any of those may be adopted.

In addition, in the third modification example, the control of reading the access information is performed separately from the control of reading of the backup under the assumption that the access information is stored in the area separate from the area for the backup, and the access information is regarded as the data having a separate ECC. In contrast, as another modification example, the ECC of the access information and the backup may be generated integrally.

The embodiments described above are examples for realizing the present application, and the items in the embodiments and the specific items in the claims have correspondence relationships respectively. Similarly, the specific items in the claims and the items with the same name as that in the embodiments of the present application have correspondence relationships respectively. However, the present application is not limited to the embodiments, and can be realized by executing various modifications to the embodiments without departing from the scope of the technology.

In addition, the processing procedures described in the above embodiments may be considered as a method having a series of procedures, or may be considered as a program for causing a computer to execute a series of procedures or as a recording medium that stores the program. For example, a compact disc (CD), a minidisc (MD), a digital versatile disc (DVD), a memory card, or a Blu-ray® disc may be used as the recording medium.

The present application can have configurations as follows.

(1) A storage control device includes:
   an error detection-correction unit that reads system information for operating a system from a first memory and performs error detection-correction processing; and
   a control unit that supplies the system information to a host computer in a case where the detection-correction processing is successful, and reads a backup of the system information from a second memory and supplies the backup of the system information to the host computer in a case where the detection-correction processing fails.

(2) The storage control device according to above (1) further includes:
   a decompression unit that decompresses the backup of the system information compressed and stored in the second memory and supplies the decompressed backup of the system information to the control unit.

(3) The storage control device according to above (1) or (2) further includes:
   a second error detection-correction unit that performs error detection-correction processing of the backup of the system information read from the second memory,
   in which, in a case where the detection-correction processing of the backup of the system information is successful, the control unit supplies the backup to the host computer as the system information.

(4) The storage control device according to above (3),
   in which, in a case where the detection-correction processing of the backup of the system information is successful, the control unit causes the backup to be stored in the first memory as the system information.

(5) The storage control device according to above (3),
   in which, in a case where the detection-correction processing of the backup of the system information fails, the control unit notifies the host computer that the startup is not possible.

(6) The storage control device according to above (3),
   in which the second error detection-correction unit has a higher error detection-correction capability than that of the error detection-correction unit.

(7) The storage control device according to any one of above (1) to (6),
   in which, in a case where an update of the system information is instructed, the control unit causes the newly instructed system information to be stored in the first and second memories.

(8) The storage control device according to any one of above (1) to (7),
   in which, in a case where the detection-correction processing fails, the control unit reads history information that is made of a plurality of backups of the system information, selects any one of the backups included in the history information, and supplies the selected backup to the host computer as the system information.

(9) The storage control device according to above (8),
   in which the control unit causes the selected backup to be stored in the first memory as the system information.

(10) The storage control device according to any one of above (1) to (9) further includes:
   a correspondence table that holds a correspondence relationship between the system information stored in the first memory and the backup of the system information stored in the second memory,
   in which the control unit reads the backup of the system information which corresponds to the system information, from the second memory based on the correspondence table.

(11) The storage control device according to any one of above (1) to (10) further includes:
   an access information management unit that manages an access history of the backup of the system information stored in the second memory,
   in which the control unit instructs the second memory to rewrite the backup of the system information based on the access history.

(12) The storage control device according to any one of above (1) to (11),
   in which, in a case where the detection-correction processing fails, the control unit notifies that it will take some time to supply the system information.

(13) The storage control device according to any one of above (1) to (12),
   in which the control unit compares the system information stored in the first memory and the backup of the system information stored in the second memory, and checks whether both are coincident with each other or not.

(14) A storage device includes:
a first memory that stores system information for operating the system;
a second memory that stores a backup of the system information;
an error detection-correction unit that reads the system information from the first memory and performs error detection-correction processing; and
a control unit that supplies the system information to a host computer in a case where the detection-correction processing is successful, and reads a backup of the system information from a second memory and supplies the backup of the system information to the host computer in a case where the detection-correction processing fails.

(15) The storage device according to above (14),
in which the first and second memories are non-volatile memories, and
in which a processing time of the first memory is shorter than that of the second memory.

(16) An information processing system includes:
a host computer;
a first memory that stores system information for operating the information processing system;
a second memory that stores a backup of the system information;
an error detection-correction unit that reads the system information from the first memory and performs error detection-correction processing; and
a control unit that supplies the system information to the host computer in a case where the detection-correction processing is successful, and reads the backup of the system information from the second memory and supplies the backup of the system information to the host computer in a case where the detection-correction processing fails.

(17) A storage control method includes:
an error detection-correction processing procedure in which the system information from the first memory is read and error detection-correction processing is performed; and
a control procedure in which the system information is supplied to the host computer in a case where the detection-correction processing is successful, and the backup of the system information is read from the second memory and the backup of the system information is supplied to the host computer in a case where the detection-correction processing fails.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A storage control device comprising:
an error detection-correction unit that reads system information for operating a system from a first memory and performs error detection-correction processing; and
a control unit that supplies the system information to a host computer in a case where the error detection-correction processing is successful, and reads a backup of the system information from a second memory and supplies the backup of the system information to the host computer in a case where the detection-correction processing fails,
wherein the first memory includes a resistance change type memory and the second memory includes a flash memory,
wherein the second memory is configured to store a compressed system information as the backup of the system information and the second memory is not provided in the control unit, and
wherein the first memory is configured to store the system information and the system information is not compressed in the first memory.

2. The storage control device according to claim 1, further comprising:
a decompression unit that decompresses the backup of the system information compressed and stored in the second memory and supplies the decompressed backup of the system information to the control unit.

3. The storage control device according to claim 1, further comprising:
a second error detection-correction unit that performs detection-correction processing of the backup of the system information read from the second memory,
wherein, in a case where the detection-correction processing of the backup of the system information is successful, the control unit supplies the backup to the host computer as the system information.

4. The storage control device according to claim 3,
wherein, in a case where the detection-correction processing of the backup of the system information is successful, the control unit causes the backup to be stored in the first memory as the system information.

5. The storage control device according to claim 3,
wherein, in a case where the detection-correction processing of the backup of the system information fails, the control unit notifies the host computer that the startup is not possible.

6. The storage control device according to claim 3,
wherein the second error detection-correction unit has a higher error detection-correction capability than that of the error detection-correction unit.

7. The storage control device according to claim 1,
wherein, in a case where an update of the system information is instructed, the control unit causes the newly instructed system information to be stored in the first and second memories.

8. The storage control device according to claim 1,
wherein, in a case where the detection-correction processing fails, the control unit reads history information that is made of a plurality of backups of the system information, selects any one of the backups included in the history information, and supplies the selected backup to the host computer as the system information.

9. The storage control device according to claim 8,
wherein the control unit causes the selected backup to be stored in the first memory as the system information.

10. The storage control device according to claim 1, further comprising:
a correspondence table that holds a correspondence relationship between the system information stored in the first memory and the backup of the system information stored in the second memory,
wherein the control unit reads the backup of the system information which corresponds to the system information, from the second memory based on the correspondence table.

11. The storage control device according to claim 1, further comprising:
an access information management unit that manages an access history of the backup of the system information stored in the second memory,
wherein the control unit instructs the second memory to rewrite the backup of the system information based on the access history.

12. The storage control device according to claim 1, wherein, in a case where the detection-correction processing fails, the control unit notifies that it takes some time to supply the system information.

13. The storage control device according to claim 1, wherein the control unit compares the system information stored in the first memory and the backup of the system information stored in the second memory, and checks whether both are coincident with each other or not.

14. A storage device comprising:
a first memory that stores system information for operating the system;
a second memory that stores a backup of the system information;
an error detection-correction unit that reads the system information from the first memory and performs error detection-correction processing; and
a control unit that supplies the system information to a host computer in a case where the detection-correction processing is successful, and reads the backup of the system information from the second memory and supplies the backup of the system information to the host computer in a case where the detection-correction processing fails,
wherein the first memory includes a resistance change type memory and the second memory includes a flash memory,
wherein the backup of the system information is a compressed system information stored in the second memory and the second memory is not provided in the control unit, and
wherein the system information is not compressed in the first memory.

15. The storage device according to claim 14, wherein the first and second memories are non-volatile memories, and
wherein a processing time of the first memory is shorter than that of the second memory.

16. An information processing system comprising:
a host computer;
a first memory that stores system information for operating the information processing system;
a second memory that stores a backup of the system information;
an error detection-correction unit that reads the system information from the first memory and performs error detection-correction processing; and
a control unit that supplies the system information to the host computer in a case where the detection-correction processing is successful, and reads the backup of the system information from the second memory and supplies the backup of the system information to the host computer in a case where the detection-correction processing fails,
wherein the first memory includes a resistance change type memory and the second memory includes a flash memory,
wherein the backup of the system information is a compressed system information stored in the second memory and the second memory is not provided in the control unit, and
wherein the system information is not compressed in the first memory.

17. A storage control method comprising:
an error detection-correction procedure in which the system information from the first memory is read and error detection-correction processing is performed; and
a control procedure in which the system information is supplied to the host computer in a case where the detection-correction processing is successful, and the backup of the system information is read from the second memory and the backup of the system information is supplied to the host computer in a case where the detection-correction processing fails,
wherein the first memory includes a resistance change type memory and the second memory includes a flash memory,
wherein the second memory is configured to store a compressed system information as the backup of the system information and the second memory is not provided in the control unit, and
wherein the first memory is configured to store the system information and the system information is not compressed in the first memory.

18. The storage control device according to claim 1, wherein the first memory is a high-speed non-volatile memory and the second memory is a low-speed non-volatile memory.

19. The storage device according to claim 14, wherein the first memory is a high-speed non-volatile memory and the second memory is a low-speed non-volatile memory.

20. The information processing system according to claim 16, wherein the first memory is a high-speed non-volatile memory and the second memory is a low-speed non-volatile memory.

* * * * *